US012572956B2

(12) United States Patent
Hong

(10) Patent No.: US 12,572,956 B2
(45) Date of Patent: Mar. 10, 2026

(54) SERVICE PROVIDING APPARATUS AND METHOD FOR PROVIDING SEARCH TERM NETWORK BASED ON SEARCH PATH

(71) Applicant: Ascent Korea Co., Ltd., Seoul (KR)

(72) Inventor: Ki Joo Hong, Seongnam-si (KR)

(73) Assignee: Ascent Korea Co., Ltd., Seoul (KR)

( * ) Notice: Subject to any disclaimer, the term of this patent is extended or adjusted under 35 U.S.C. 154(b) by 117 days.

(21) Appl. No.: 18/371,292

(22) Filed: Sep. 21, 2023

(65) Prior Publication Data

US 2024/0127287 A1     Apr. 18, 2024

(30) Foreign Application Priority Data

Oct. 14, 2022     (KR) ........................ 10-2022-0132228

(51) Int. Cl.
G06Q 30/00 (2023.01)
G06Q 30/0251 (2023.01)
(52) U.S. Cl.
CPC ..... G06Q 30/0256 (2013.01); G06Q 30/0271 (2013.01)
(58) Field of Classification Search
None
See application file for complete search history.

(56) References Cited

U.S. PATENT DOCUMENTS

| | | | |
|---|---|---|---|
| 8,498,984 B1 | 7/2013 | Hwang et al. | |
| 8,977,621 B1 * | 3/2015 | Paiz ...................... | G06F 16/951 |
| | | | 707/738 |
| 11,216,503 B1 | 1/2022 | Chen et al. | |
| 2010/0010989 A1 * | 1/2010 | Li ........................... | G06F 16/334 |
| | | | 707/E17.017 |
| 2010/0228742 A1 * | 9/2010 | Vandelle ................ | G06Q 30/02 |
| | | | 707/750 |
| 2012/0158639 A1 * | 6/2012 | Moore ................... | G06F 16/282 |
| | | | 706/55 |
| 2019/0005049 A1 * | 1/2019 | Mittal ................. | G06F 16/3347 |
| 2020/0279191 A1 * | 9/2020 | Koch ................. | G06Q 30/0255 |
| 2021/0192371 A1 * | 6/2021 | Tago ...................... | G06N 20/00 |
| 2022/0004589 A1 * | 1/2022 | Park ...................... | G06F 40/279 |
| 2023/0054187 A1 * | 2/2023 | Das .................... | G06Q 30/0631 |

FOREIGN PATENT DOCUMENTS

KR     10-2014-0091375 A     7/2014

* cited by examiner

*Primary Examiner* — Christopher Stroud
(74) *Attorney, Agent, or Firm* — Heedong Chae; Lucem, PC

(57) ABSTRACT

The present disclosure relates to a service providing apparatus and method for providing a search term network based on a search path. In more detail, the present disclosure relates to a service providing apparatus and method for providing a search term network based on a search path, the apparatus and method configured to provide support to be able to easily select and use a search term having the highest relevance for marketing until reaching a user's request search term by creating and providing a search term network visualizing the connection relationship between search terms and a search term having a high degree of importance on the basis of a search path making it possible to find the relationship between other search terms relevant to the user's request search term and the search term as a distance.

12 Claims, 19 Drawing Sheets

| Keyword | Basic search word | Related search word |
|---|---|---|
| Kookmin Bank | Kookmin Bank Ga | [Kookmin Bank virtual account, Kookmin Bank household account book, Kookmin Bank virtual account deposit time..] |
| Kookmin Bank | Kookmin Bank Na | [Kookmin Bank Narasarang Card, Kookmin Bank Narasarang Card benefit, Kookmin Bank Namuwiki...] |
| Kookmin Bank | Kookmin Bank Da | [Kookmin Bank calendar, Kookmin Bank dollar, Kookmin Bank mortgage...] |

FIG. 3

| Featrure | Description |
|---|---|
| AD | As advertising area related to search word, displayed as advertising at top left side of search result |
| AD Carousel | As advertising area related to search word, display bundle of information such as price, image, etc. of product which is advertised jointly by thumbnail |
| Application | Display description and installation icons for mobile application by icons |
| Featured Snippents | Positioned above general search in search result page, and display correct answer of search in form of simple text and table |
| Image | Display image and tag information related to search word |
| Job Search | When search word related to recruit is inputted, display information related to recruit such as job title, type of company recruit, etc. |
| Knowledge panel | Display person, place, company, local business, non-profit institution, other widely known entity name information |
| Local Result | Display location based result by map according to subject of search word and geographical location of searching person |
| People also ask for | Collection of additional questions related to search word |
| People also search for | Collection of other search words searched jointly with search word |
| Related Searches | Collection of other search words related to search word |
| Sitelinks | Display website information related to search word |
| Twitter Carousel | Display up-to-date or popular twitter information related to search word |
| Unit Converter | Area providing function of converting unit such as length or weight |
| Video Carousel | Display video information related to search word |

FIG. 4

| Items searched jointly | Related search word |
|---|---|
| Q Women's perfume ranking 2021 | Q Olive Young women's perfume recommendation |
| Q 20s women's perfume ranking 2021 | Q Women's perfume present |
| Q 40s women's perfume recommendation | Q Women's perfume brand ranking |
| Q 30s women's perfume recommendation | Q Sweet women's perfume |
| Q 10s women's perfume recommendation | Q Women's perfume ranking which men like |
| Q Subtle women's perfume | Q Jomalone women's perfume ranking |

FIG. 5

| Search word | Search quantity | Advertising unit price | Competition index |
|---|---|---|---|
| Women's perfume | 1000 | 0.59 | 0.99 |
| Women's perfume recommendation ranking 2021 | 20 | 0.3 | 0.85 |
| 20s women's perfume ranking 2021 | 100 | 0 | 0.75 |
| Subtle women's perfume | 20 | 0.43 | 1 |

[['Women's perfume'–>'Women's perfume recommendation ranking 2021'
–>'Subtle women's perfume', 'Women's perfume'–>
'20s women's perfume ranking 2021'–>'Subtle women's perfume']]

```
{
"query":"Anbang grill",
"order":"Advertising unit price",
"result":

[{"rank":1,"path":['grill','Grill','grill recommendation,'Anbang grill',
        'Anbang grill 501','Anbang grill ab301mf','Fish grill'],
        "score":0.4854},
    {"rank":2,"['Oil non-spattering grill','Anbang grill','Anbang grill
        disadvantage','Electric grill disadvantage']"score":0.3865},
    {"rank":3,"path":['Oil non-spattering grill','Oil non-spattering grill',
        'Anbang grill','Anbang grill disadvantage','Electric grill
        disadvantage']"score":0.3315},
    {"rank":4,"path":['Anbang grill','Anbang grill disadvantage',
    'Electric grill disadvantage']"score":0.3286},
    {"rank":5,"path":['Aone grill','Anbang grill','Anbang grill
    disadvantage','Electric grill disadvantage']"score":0.3258},
    {"rank":6,"path":['Non-smoke grill','Anbang grill','Anbang grill
    disadvantage','Electric grill disadvantage']"score":0.3181},
    {"rank":7,"path":['Tefal induction frying pan','Tefal electric
    frying pan','Anbang grill','Anbang grill disadvantage','Anbang grill
    Clien']"score":0.3058},
    {"rank":8,"path":['Electric grill pan recommendation','Anbang grill',
    'Anbang grill','Electric grill disadvantage']"score":0.3025},
    {"rank":9,"path":['Meat roasting grill','Anbang grill','Anbang grill
    vs Zaigle']"score":0.2998},
    {"rank":10,"path":['Anbang grill','Anbang grill','Anbang grill
    disadvantage','Electric grill disadvantage']"score":0.2972}]
}
```

FIG. 8

Men's slacks    | UNDIRECTED⌄ |   | 2 ⌄ |       | Search |

| "source" | "relationship" | "destination" |
|---|---|---|
| {"name":"Men's slacks"} | [{"closeness":7}] | {"name":"Cost-effective slacks"} |
| {"name":"Men's slacks"} | [{"closeness":3}] | {"name":"Men's tapered slacks"} |
| {"name":"Men's slacks"} | [{"closeness":2}] | {"name":"36 slacks"} |
| {"name":"Men's slacks"} | [{"closeness":1}] | {"name":"Wiki slacks"} |
| {"name":"Men's slacks"} | [{"closeness":1}] | {"name":"Fit the size slacks"} |

FIG. 11

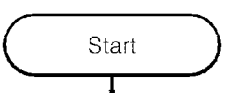

Start

One or more basic search terms, in which keyword and characters are combined, are automatically created while adding series of different characters to keyword, and one or more related search terms relevant to basic search term are obtained through preset search engine — S1

Following search terms are extracted on basis of search result list information converted by applying related search term to search engine as input search term, and then relationship information about distance from input search term are created and stored in search term relation DB for each of one or more following search terms using distance calculation method of calculating, as distance, weight for connection relationship between input search term and following search term according to exposure ranking of following search term in response result corresponding to following search term and feature of response result — S2

Directed weighted graph setting inter-node distances is created by setting plurality of search terms as nodes, respectively, on basis of the plurality of items of relationship information, then search path information is created for each of one or more search paths connecting a start node and an end node determined in accordance with an algorithm set in advance in the directed weighted graph, statistics information averaging statistics for respective items set in advance for plurality of search terms included in the search path information is created, and then statistics information are matched and stored with search path information in search path DB — S3

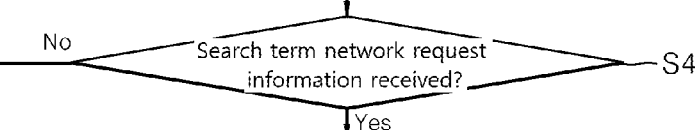

No    Search term network request information received? — S4

Yes

One or more items of search path information including requested search term according to search term network request information, which includes requested search term and search condition, and satisfying search condition are extracted from search path DB, search term network is created on basis of extracted one or more items of search path information, plurality of different search term groups are formed for search term network in accordance with preset grouping algorithm, and then search term network created by making plurality of different search term groups for search term network in accordance with preset grouping algorithm and then setting different properties so that plurality of different search term groups can be visually discriminated from each other is transmitted to user device. — S5

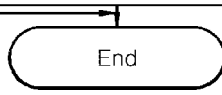

End

FIG. 19

SERVICE PROVIDING APPARATUS AND METHOD FOR PROVIDING SEARCH TERM NETWORK BASED ON SEARCH PATH

CROSS-REFERENCE TO RELATED APPLICATIONS

This application claims the priority of Korean Patent Application No. 10-2022-0132228 filed on Oct. 14, 2022, in the Korean Intellectual Property Office, the disclosure of which is incorporated herein by reference.

BACKGROUND OF THE INVENTION

Field of the Invention

The present disclosure relates to a service providing apparatus and method for providing a search term network based on a search path. In more detail, the present disclosure relates to a service providing apparatus and method for providing a search term network based on a search path, the apparatus and method configured to provide support to be able to easily select and use a search term having the highest relevance for marketing until reaching a user's request search term by creating and providing a search term network visualizing the connection relationship between search terms and a search term having a high degree of importance on the basis of a search path making it possible to find the relationship between other search terms relevant to the user's request search term and the search term as a distance.

Description of the Related Art

Recently, various strategies for publicizing products or services are developed and keyword search of these strategies becomes a necessary element in an advertising/marketing strategy with the development of the internet.

In particular, finding an efficient keyword for advertisement in on-line commerce plays a role that is large enough to determine the result throughout marketing.

Further, a search user finally determines an action (subscription, purchase, etc.) after repeatedly performing search and evaluation processes when searching for a certain product, service, or the like.

For example, search for purchase may be frequently converted into purchase through a procedure of starting from a general keyword, moving on to a detailed brand or a product keyword, seeing reviews or ranks or comparing competitive companies in the product group, etc. In this case, a search term finally contributing to conversion itself has a relatively large search volume or a high conversion rate, so the search term is easy to find, but the advertising unit price is high, so it may not be appropriate in terms of advertisement efficiency.

However, search terms in the search and evaluation processes around the conversion step have a relatively small search volume or are not severely competitive in terms of advertisement in many cases, so the advertising unit price is low, and accordingly, they may be more appropriate in terms of advertisement efficiency.

As described above, it is very important to secure a search term suitable for advertising and marketing in consideration of advertisement efficiency, but search terms in the search and evaluation processes around the conversion step are long tail keywords that are relatively difficult to find in many cases, so there is a problem that it is difficult to formulate a marking strategy or optimize advertisement using such keywords.

Various search engines provide related search terms related to a search term having a high advertising unit price in the related art, but they only provide simply related search terms, so related search terms are very various and marketers or sellers have difficulty in discriminating high-efficiency related search terms until reaching a desired search term, whereby it is difficult to select a search term that can increase advertisement efficiency.

That is, there is a problem that although there are many keywords required for formulating a marketing strategy or optimizing advertisement around the conversion step (the needs of users about products and services, comparison items in product groups, information required before and after purchase), common companies or users have difficulty in finding and using the keywords.

SUMMARY OF THE INVENTION

An objective of the present disclosure is to provide support so that a user can easily select a related search term while increasing marketing efficiency by creating a basic search term while adding different letters to a keyword, by expanding the search term through addition of a related search term, which is provided by a search engine, to the basic search term, by creating a path showing the relationship between the related search term and a following search term, which is obtained on the basis of a search result through the search engine using the related search term as an input search term, as a distance on the basis of the search result, by creating a search term network on the basis of a path list related to a search term requested by a user by creating such path for each of various search terms, and then visualizing and providing the search term network so that the user can easily select a related search term having high relevance until visually reaching the request search term.

A service providing apparatus for providing a search term network based on a search path according to an embodiment of the present disclosure includes: a search path manager configured to automatically create one or more basic search terms in which a keyword and characters are combined while adding a series of different characters to the keyword, to obtain one or more related search terms relevant to the basic search term though a preset search engine, and then to extract one or more following search terms, based on search result list information converted by applying the related search term to the search engine as an input search term, to create and store relationship information about a distance from the input search term in a search term relationship DB for each of the one or more following search terms using a distance calculation method of calculating, as a distance, a weight for connection relationship between the input search term and a following search term according to an exposure ranking of a following search term in a response result according to a response function corresponding to a following search term of a response function, which the search engine uses by figuring out search intention of the input search term, and a feature of the response result, and to create and store search path information in a search path DB for each of one or more search paths connecting a start node and an end node determined in accordance with a preset algorithm by setting a plurality of search terms as nodes, based on a plurality of items of relation information stored in the search term relationship DB; and a search result provider configured to extract one or more items of search path information, which includes a requested search term and satisfies a search condition, from the search path DB when search term network request information including the requested search term and the search condition is received from a user terminal, to create a search term network connecting different search terms having a distance on the basis of the extracted one or more items of search path information, to make a plurality of different search term groups in accordance with a preset grouping algorithm for the search term network, and then to provide search term network information, which is created by setting different properties so that the plurality of different search term groups can be visually discriminated from each other, to the user terminal.

As an example related to the present disclosure, the search path manager may include: a search term expander configured to automatically create one or more items of basic search terms, in which a keyword and characters are combined, while adding a series of different characters to the keyword, and to obtain one or more related search terms relevant to the basic search terms through a preset search engine; a search information extractor configured to extract one or more following search terms from each of one or more response results respectively corresponding to features of one or more response features, which a search engine used by figuring out search intention of an input search term based on search result list information converted by applying the related search term to the search engine as the input search term, and then to create and store relationship information about a distance from the input search term in a search term relation DB for each of one or more following search terms using a distance calculation method of calculating, as a distance, a weight for connection relationship between the input search term and a following search term according to an exposure ranking of a following search term in a response result corresponding to the following search term and a feature of the response result; and a search path extractor configured to create a directed weighted graph in which an inter-node distance is set by setting a plurality of search terms as nodes based on a plurality of items of relationship information stored in the search term relationship DB, and then to create and store search path information in a search path DB for each of one or more search paths connecting a start node and an end node determined in accordance with a preset algorithm in the directed weighted graph.

As an example related to the present disclosure, the search information extractor may calculate the weight by multiplying preset priority for a feature corresponding to the following search term by an exposure ranking for the following search term in a response result corresponding to the following search result, and may set the calculated weight as the distance between the following search term and the input search term.

As an example related to the present disclosure, the search information extractor may extract one or more texts as additional following search terms corresponding to the following search terms, respectively, from each of one or more response results respectively corresponding to features for each of one or more response functions, which the search engine used by figuring out search intention of other input search terms based on search result list information in accordance with the distance calculation method converted by applying the following search terms as the input search terms to the search engine; may calculate, as a distance, a weight for connection relationship between the input search terms and the additional following search terms according to exposure rankings of the additional following search terms in response results corresponding to the additional following search terms and features of the response results; and may create and store relation information about distances from the input search terms that are the following search terms in the search term relationship DB for each of the one or more additional following search terms.

As an example related to the present disclosure, the search condition may include a connection direction with another node from a node corresponding to the requested search term, and the number of hops, and the search result provider may create a search term network by extracting one or more items of search path information satisfying the requested search term and the search condition and then by applying the extracted one or more items of search path information to ForceAtlas2 algorithm, and may create search term network information for a search term network grouped in a plurality of different search term groups by applying the search term network to louvain algorithm.

As an example related to the present disclosure, the search path manager may obtain and store a search volume for each search term through the external server or the search engine, and the search result provider may check a search volume for each of search terms included in the search term network and creates a search term network in which a size of a node corresponding to a search term is adjusted in accordance with the search volume of the search term; may check one or more surrounding nodes connected with a specific node corresponding to a search term for each of the search terms included in the search term network and then calculates a network centrality index of a search term corresponding to the specific node in consideration of centrality of the specific node according to the number of the surrounding nodes and positions of the surrounding nodes and distances between the specific node and the surrounding nodes; and may create a search term network set such that a node of a search term having a network centrality index, which is equal to or higher than a reference value set in advance in accordance with a network centrality index calculated for each of the search terms, is separated from another node having a network centrality index less than the reference value.

As an example related to the present disclosure, the search result provider may calculate the network centrality index of a search term using at least one of degree centrality, betweenness centrality, closeness centrality, and pagerank.

As an example related to the present disclosure, the search result provider, based on respective search intention determination conditions for a plurality of steps set in advance to figure out search intention in one or more search result pages converted by applying a search term included in the search term network to the search engine, may check whether one or more preset search result items according to the search intention determination condition exist in upper N search results, and simultaneously, recognize a search intention determination condition for each of one or more steps, which the one or more search result pages satisfy, among the respective search intention determination conditions for a plurality of steps; may put preset search intention into a search term network by setting the preset search intention to the search term to correspond to the recognized search intention determination condition for each of one or more steps among a plurality of preset search intentions, thereby setting search intention for each of search terms pertaining to the search term network; and may create a search term network in which search detection for each of the search terms is set.

As an example related to the present disclosure, the one or more search result items set in the search intention determination condition may include at least one of an encyclopedia page, a recommendation snippet, a knowledge panel, a video, academic search, a news item, a local map, a site link, an AD carousel, a keyword advertisement, and a URL of a pre-stored switch page.

A service providing method for providing a search term network based on a search path of a service providing apparatus includes: automatically creating one or more items of basic search terms, in which a keyword and characters are combined, while adding a series of different characters to the keyword, and obtaining one or more related search terms relevant to the basic search terms through a preset search engine; extracting one or more following search terms based on search result list information converted by applying the related search term to the search engine as an input search term, and then creating and storing relationship information about a distance from the input search term in a search term relation DB for each of one or more following search terms using a distance calculation method of calculating, as a distance, a weight for connection relationship between the input search term and a following search term according to an exposure ranking of a following search term in a response result according to a response function corresponding to a following search term of a response function, which a search engine uses by figuring out search intention of the input search term, and a feature of the response result; creating and storing search path information in a search path DB for each of one or more search paths connecting a start node and an end node determined in accordance with a preset algorithm by setting a plurality of search terms as nodes, based on a plurality of items of relation information stored in the search term relationship DB; and extracting one or more items of search path information, which includes a requested search term and satisfies a search condition, from the search path DB when search term network request information including the requested search term and the search condition is received from a user terminal, creating a search term network based on the extracted one or more items of search path information, making a plurality of different search term groups in accordance with a preset grouping algorithm for the search term network, and then providing search term network information, which is created by setting different properties so that the plurality of different search term groups can be visually discriminated from each other, to the user terminal.

The present disclosure can obtain, as a distance, the relationship between search terms in accordance with the search intention of an input search term and the exposure ranking of a following search term corresponding to the input search term, using a search engine, and can create and provide a search term network grouping and visualizing a plurality of search terms having high relevance on the basis of the distance between search terms according to search path information obtained for each of a plurality of different search terms on the basis of the distance obtained above. Accordingly, there is an effect that it is possible to provide search terms of which the relevance with a requested search term by a user is equal to or higher than a predetermined level and the search volume is equal to or higher than a predetermined level so that the user can clearly check the search terms through a search term network, and it is possible to greatly improve satisfaction and convenience of a user because it is possible to provide support to be able to easily find search terms that have high marketing efficiency and are not severely competitive in terms of price among search terms positioned around a requested search term checked through the search term network.

Further, since the present disclosure can set and provide search intention, which is considered most when users use a corresponding search term, for each of search terms pertaining to a search term network in the search term network, there is an effect that it is possible to support a seller who wants the perform marketing to be able to easily find a search term having search intention coinciding with the business purpose and having high marketing efficiency through the search term network.

Further, the present disclosure expresses connection relationship between search terms beyond the level of simply providing related search terms through a search term network UI created on the basis of search paths, whereby there is an effect of providing main search procedures for products or services by users such that they can find the procedures, and in addition, supporting users to be able to more intuitionally find their needs about what they request and what they compare.

BRIEF DESCRIPTION OF THE DRAWINGS

The above and other aspects, features and other advantages of the present invention will be more clearly understood from the following detailed description taken in conjunction with the accompanying drawings, in which:

FIG. 3 is an exemplary diagram of a process of obtaining related search terms by the service providing apparatus according to an embodiment of the present disclosure;

FIG. 4 is an exemplary diagram showing the service providing apparatus according to an embodiment of the present disclosure defining SERP feature types;

FIG. 5 is an exemplary diagram showing the service providing apparatus according to an embodiment of the present disclosure detecting following related search terms;

FIG. 7 is an exemplary diagram the service providing apparatus according to an embodiment of the present disclosure creating a search path;

FIG. 8 is an exemplary diagram showing the service providing apparatus according to an embodiment of the present disclosure providing an API-based recommended list information including a recommended search path;

FIG. 11 is an exemplary diagram showing a process of receiving search term network request information by the service providing apparatus according to an embodiment of the present disclosure;

FIG. 19 is a flowchart showing a service providing method of providing a search term network based on a search path according to an embodiment of the present disclosure.

DETAILED DESCRIPTION OF THE PREFERRED EMBODIMENT

Hereinafter, a detailed embodiment of the present disclosure will be described with reference to the drawings.

Figure 1:
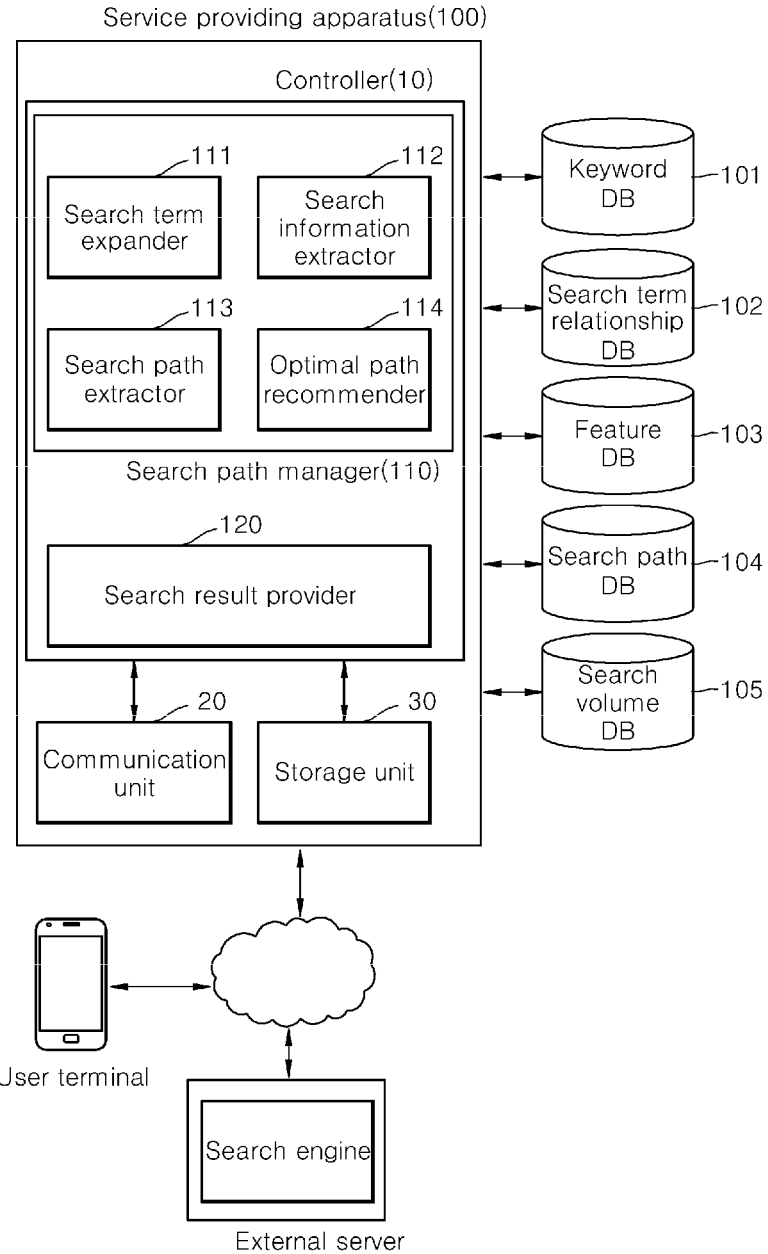
FIG. 1 is a configuration diagram of a service providing apparatus for providing a search term network based on a search path according to an embodiment of the present disclosure.

FIG. 1 is a configuration diagram of a service providing apparatus for providing a search term network based on a search path (hereafter, a service providing apparatus) according to an embodiment of the present disclosure.

As shown in the figure, a service providing apparatus 100 according to an embodiment of the present disclosure may include a communication unit 20, a storage unit 30, a controller 10, etc., and is not limited thereto and may include various components.

First, the communication unit 20 can communicate with one or more user terminals and various external servers through a communication network.

The communication network described in the present disclosure may include wired/wireless communication networks, and the wireless communication network, for example, may include Wireless LAN (WLAN), Digital Living Network Alliance (DLNA), Wireless Broadband (Wibro), World Interoperability for Microwave Access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), a 5G mobile communication service, Bluetooth, Long Range (LoRa), Radio Frequency Identification (RFID), Infrared DataAssociation (IrDA), Ultra Wideband (UWB), ZigBee, Near Field Communication (NFC), Ultra Sound Communication (USC), Visible Light Communication (VLC), Wi-Fi, Wi-Fi Direct, etc. Further, the wired communication network may include a Local Area Network (LAN), a wired Wide Area Network (WAN), Power Line Communication (PLC), USB communication, Ethernet, serial communication, an optical/coaxial cable, etc.

Further, the storage unit 30 can store various items of information. The storage unit 30 may be configured in various types such as a Hard Disk Drive (HDD) and a Solid State Drive (SSD) and may include one or more DBs.

For example, the storage unit 30 may include a plurality of DBs that is required for operation of the service providing apparatus 100, and may include various DBs such as a keyword DB 101 in which a plurality of different keywords is stored, a related term relationship DB 102 in which relationship information about the relationship between related terms is stored, a feature DB 103 in which information relevant to features corresponding to related terms is stored, a search path DB 104 in which information about search paths and statistics corresponding to search terms is stored, and a search volume DB 105 in which search volume information including a statistic for each of preset items is stored for each of search terms.

In this case, the plurality of DBs stored in the storage unit 30 each may be configured as a separate database server and the service providing apparatus 100 can be linked while communicating with a plurality of different database servers through a communication network.

Further, the controller 10 may perform a general control function of the service providing apparatus 100 and may include a RAM, a ROM, a CPU, a GPU, and buses, and the RAM, the ROM, the CPU, the GPU, etc. may be connected through the buses.

Further, the communication unit 20 and the storage unit 30 may be included in the controller 10.

In this case, the controller 10 and at least one of various components constituting the controller 10 can communicate with the user terminals and external servers through the communication unit 20, and a communication configuration through the communication unit is omitted hereafter.

Further, as shown in the figure, the controller 10 may include a search term expander 111, a search information extractor 112, a search path extractor 113, and an optimal path recommender 114.

In this case, a plurality of components constituting the controller 10 may be implemented by a processor that can process data, etc., and may be separately implemented by different processors or may be functionally separated in one processor.

The detailed operation configuration of the service providing apparatus 100 is described hereafter with reference to drawings on the basis of the configuration described above.

Figure 2:
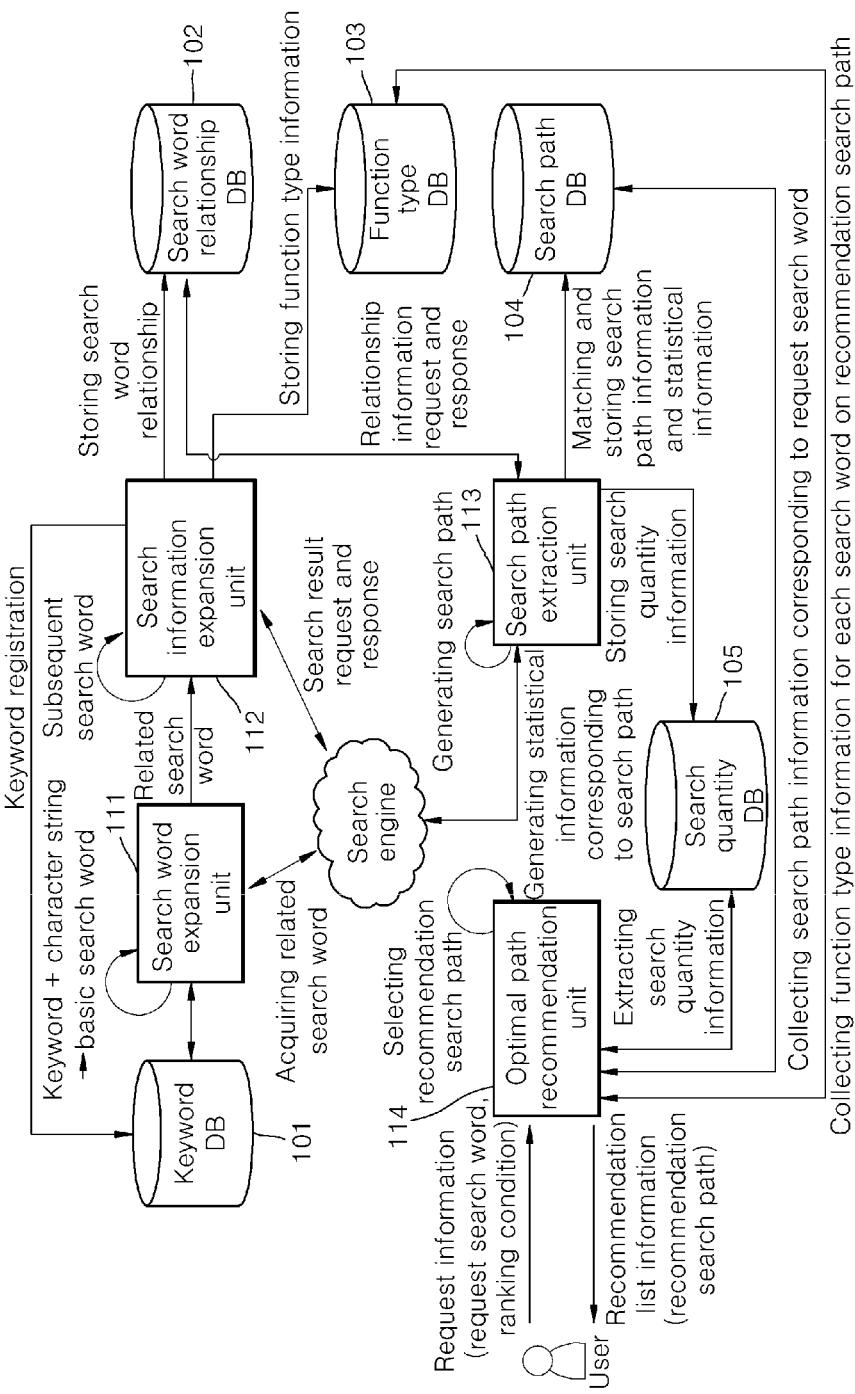
FIG. 2 is an exemplary operation diagram of the service providing apparatus according to an embodiment of the present disclosure.

FIG. 2 is a detailed operation configuration diagram of the service providing apparatus 100 according to an embodiment of the present disclosure and the configuration of the controller 10 that performs an actual control function of the service providing apparatus 100 is mainly described.

As shown in the figure, the search term expander 111 can extract a keyword from a keyword DB 101 in which a plurality of different keywords about a company, a bran, a product, a service, a category, etc. is stored, and can automatically create one or more search terms, in which the keyword and one or more characters are combined, as basic search terms, respectively, while adding a series of different characters to the keyword.

In this case, the search term expander 111 can collect the keyword from an external knowledge server, which provides an on-line electronic dictionary, by communicating with the external knowledge server, and can store the keyword in the keyword DB 101. The external knowledge server, for example, may include DBPEDIA, Wikipedia, or the like.

For example, the search word expander 111 can connect to the external knowledge server and extract a page name or the title of a knowledge panel as the keyword.

Further, the search term expander 111 can obtain one or more related search terms relevant to the basic search term through a preset search engine.

Referring to FIG. 3 for this process, the search term expander 111 may extract 'Kookmin Bank' that is a keyword stored in the keyword DB 101, create a basic search term such as 'Kookmin Bank Ga' by adding 'Ga' to the keyword, and create a basic search term 'Kookmin Bank Na' by adding 'Na' to the keyword.

In addition, the search term expander 111 may create basic search terms corresponding to added letters, respectively, by sequentially adding letters (or characters) from 'Da' to 'Ha' to the keyword 'Kookmin Bank', and in addition to the examples, may add a letter with a final consonant such as 'Gang', add a foreign alphabet such as 'A', or add a plurality of letters such as 'GaGa' and 'AA'.

Further, letters that the search term expander 111 can add to a keyword may include a blank, special characters, etc.

Further, the search term expander 111 may obtain a related search term relevant to the 'Kookmin Bank Ga' from a search engine by applying the 'Kookmin Bank Ga' created as described above to a search engine set in advance in the service providing apparatus 100 or a search engine that is provided from an external server through communication with the external server.

As an example of the search engine, a search engine of 'NAVER' or 'GOOGLE' may be used, and when the search engine is included in the service providing apparatus 100, execution data relevant to the search engine may be stored on the storage unit 30 of the service providing apparatus 100.

Further, the related search term may be an auto-completed search term (or an auto-completed query word) that the search engine automatically completes as a meaningful search term (or a query word) after receiving a basic search term.

For example, when the search engine receives the 'Kookmin Bank Ga' as a basic search term from the search term expander 111, the search engine automatically creates related search terms such as 'Kookmin Bank virtual account', 'Kookmin Bank household account book', etc. that start with 'Kookmin Bank Ga' or include the basic search term, and the search term expander 111 can create one or more related search terms for one basic search term from a search engine.

As another example, when the search engine receives 'iPhone Ga' as a basic search term from the search term expander 111, the search engine can automatically create related search terms such as 'iPhone price' and 'iPhone forced termination' that are auto-completed search terms starting with 'iPhone Ga' or including the basic search term.

Alternatively, the search engine may search for related search terms starting with the basic search term or including the basic search term by searching a DB, which is included in an external server providing (including) the search engine and in which various search terms are stored, on the basis of the basic search term, and then provide the related search terms to the search term expander 111.

Further, the search engine may create related search terms into sentences by searching the DB, which is included in an external server providing the search engine and in which various search terms are stored, on the basis of the basic search term, or extract the sentences including the basic search term from the DB, and provide the related search terms to the search term expander 111.

Further, the search term expander 111 can store the related search terms obtained through the search engine in the keyword DB 101 as keywords.

Meanwhile, the search information extractor 112 applies the one or more related search terms corresponding to the basic search term to the search engine as input search terms, respectively, in linkage with the search term expander 111, thereby being able to obtain search result list information including one or more search results corresponding to the input search terms through the search engine.

In this case, the search result described in the present disclosure may be search result information that is created by the search engine, and the search result information may include a search language, a search area, a search engine name, a search result position (ranking), a domain, an SERP feature, a title, a main text, etc., and may be configured as a text-based document.

Further, the search engine, in addition to providing a document-based search result in a website or a webpage for an input search term, can create and then a direct response result as the search result by figuring out the search intention of an input search term on the search engine and using a response function corresponding to the figured-out search intention of one or more different inherent response functions provided by the search engine.

For example, as shown in FIG. 4, a search engine provides response results for each of one or more response features through a Search Engine Result Page (SERP) as search results, and creates and provides a response result according to an SERP feature corresponding to a search intention of SERP features of a plurality of different response features set in advance in the search engine, such as keyword AD, AD Carousel, Application, Featured Snippets, Image, Job Search, Knowledge panel, People also search for, Related Searches, in correspondence to the search intention by figuring out the search intention of an input search term in a response result that is provided through an SERP.

For example, as shown in FIG. 5, when receiving an input search term, a search engine can create a plurality of response results respectively corresponding to 'People also search for', which is a response function for a set of other search terms searched together with the search term, 'Related searches', which is a response function for a set of other search terms relevant to the search term, etc. by figuring out the search intention of the input search term, and the response results may include the identifiers of features (response functions) corresponding to the response results, response processing results (or response contents) obtained through the response functions, etc.

That is, when receiving an input search term for 'women's perfume recommendation', a search engine figures out the search intention of the input search term, thereby being able to calculate a response result including one or more following search terms such as 'women's perfume ranking 2021' and '20's women's perfume ranking 2021' using the response function of 'People also search for' or calculate a response result including one or more following search terms such as 'Olive Young women's perfume recommendation' and 'women's perfume gift' using the response function of 'Related Searches' in accordance with the figured-out search intention, and convert a corresponding response result into a search result.

Further, the search information extractor 112 and deletes or excludes related search terms that are not searched for with anything by checking the search result list information, it may not store the related search terms in the keyword DB 101. That is, the search information extractor 112 may exclude or delete related search terms of which the search volume is 0 without storing them in the keyword DB 101.

Further, when one or more response results are included in search result list information for each of one or more items of search result list information respectively corresponding to one or more related search terms corresponding to the basic search term, the search information extractor 112 can recognize a feature in each of the one or more response results and create feature information including the recognized features and the frequency of appearance of each of the recognized features, and can match and store the created feature information with related search terms corresponding to the created feature information in the feature DB 103.

Further, the search information extractor 112 can extract one or more texts as following search terms, respectively, from each of one or more response results respectively corresponding to features of one or more response features, which a search engine used by figuring out the search intention of the input search term on the basis of search result list information converted by the search engine for the input search term, and can create relationship information for a distance from the input search term for each of the extracted one or more following search terms using (in accordance with) a distance calculation method of calculating, as a distance, a weight for the connection relationship between the input search term and a specific following search term according to the exposure ranking of the specific search term in a response result corresponding to the specific following search term and the feature of the response result corresponding to the specific following search term.

In this case, the search information extractor 112 can calculate the weight by multiplying priority set in advance for the feature corresponding to the following search term by the exposure ranking (or arrangement order) for the following search term in the response result corresponding to the following search term, and can set the calculated weight as the distance between the following search term and the input search term.

As an example of this, the search information extractor 112 can recognize 'People also search for' and 'Related Searches' that are features respectively corresponding to a plurality of response results (search results) included in search result list information of 'women's perfume recommendation' that is an input search term.

In this case, setting information, in which one or more features that are extraction targets of a following search term of a plurality of features that is provided by the search engine are set in advance, may be set in advance in the search information extractor 112, and the search information extractor 112 can extract a following search term only for the feature that is the extraction target of the following search term.

Further, different items of priority may be set in advance for one or more features that are extraction targets of the following search term in the setting information.

Accordingly, the search information extractor 112 gives 1 and 2, respectively, as priority values of 'People also search for' and 'Related Searches' that are a plurality of features recognized from the search list information corresponding to the input search term 'women's perfume recommendation' in accordance the setting information, and gives an exposure ranking (or an exposure ranking weight) in accordance with the ranking of following search terms in the features, thereby being able to extract one or more following search terms from each of a plurality of response results such as ['women's perfume ranking 2021', priority 1, exposure ranking 1, distance 1], ['20's women's perfume ranking 2021', priority 1, exposure ranking 2, distance 2], ['Olive Young women's perfume recommendation', priority 2, exposure ranking 1, distance 2], and ['women's perfume present', priority 2, exposure ranking 2, distance 4], and being able to calculate a weight, that is the product of the priority and the exposure ranking, for each of the extracted one or more following search terms and then calculate the weights as distances (distance weights) from the input search term.

In this case, the search term information extractor 112 can recognize (detect) the following search term arrangement order for each of the following search terms from the response results, and can determine the exposure rankings of the following search terms in accordance with the arrangement orders.

Further, the priority may be defined as a priority weight, the exposure ranking may be defined as an exposure ranking weight, and the distance that is calculated as the product of the priority weight and the exposure ranking weight may be defined as a distance weight.

Further, the search information extractor 112 can create relationship information, which includes the distances from an input search term calculated for one or more following search terms, the following search terms, and the input search term, for each of following search terms corresponding to the input search term, and can store the relationship information in the search term relationship DB 102.

In the configuration described above, the search information extractor 112 can apply the following search terms as other input search terms to the search engine, thereby being able to extract one or more texts as additional following search terms corresponding to the following search terms, respectively, from each of one or more response results respectively corresponding to features for each of one or more response functions, which the search engine used by figuring out the search intention of the input search terms on the basis of search result list information in accordance with the distance calculation method converted by applying the following search terms as the input search terms to the search engine, then being able to calculate, as a distance, the weight for the connection relationship between the input search terms and the additional following search terms according to the exposure rankings of the additional following search terms in response results corresponding to the additional following search terms and the features of the response results corresponding to the additional following search terms, and being able to create and store relation information about the distance from the input search terms that are the following search terms for each of the one or more additional following search terms in the search term relationship DB 102.

That is, every time the search information extractor 112 extracts a following search term corresponding to the input search term, the search information extractor 112 the applies the following search term back to a search engine as an input search term, thereby being able to repeatedly extract another following search term relevant to the following search term in accordance with the distance calculation method, and create and store relationship information about distance relationship between an input search term relevant to the another following search term and the another following search term in the search relationship DB 102.

Meanwhile, the search path extractor 113 can create a directed weighted graph setting inter-node distances by setting a plurality of search terms, which corresponds to a plurality of items of relationship information, as nodes, respectively, on the basis of the plurality of items of relationship information stored in the search term relationship DB 102, then calculate path information for each of one or more paths connecting a start node and an end node determined in accordance with an algorithm set in advance in the directed weighted graph, create statistics information averaging statistics for respective items set in advance for a plurality of search terms included in the path information in linkage with an external server providing (including) the search engine, and then match and store the statistics information with the path information in the search path DB 104.

In this case, the search path extractor 113 can determine that it is connection relationship between a plurality of different search terms having a distance value on the basis of the relationship information, and can create the directed weighted graph by connecting the plurality of different search terms using connection lines and setting a distance value to the connection lines.

Further, the path may include one or more connection lines for reaching the end node from the start node and nodes respectively corresponding to the one or more connection lines, and hereafter, the path is referred to as a search path and path information corresponding to the path is referred to as search path information.

Figure 6:
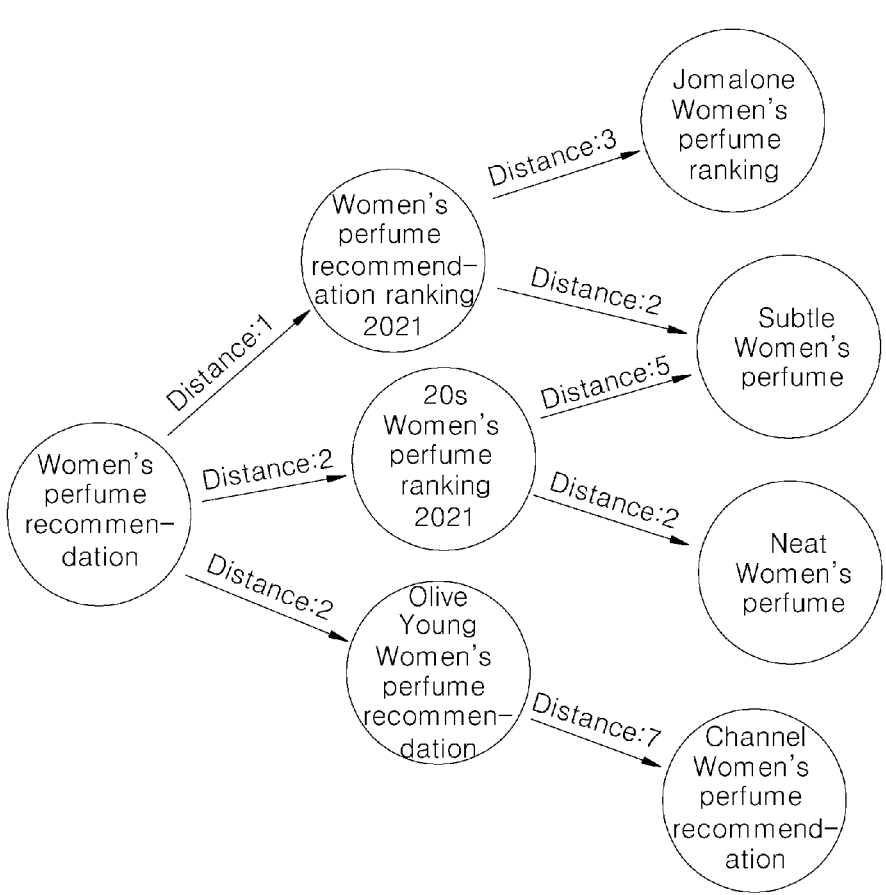
FIG. 6 is an exemplary diagram showing the service providing apparatus according to an embodiment of the present disclosure creating a related search relationship graph.

As an example of this, as shown in FIG. 6, the search path extractor 113 extracts connection relationship and distance information (weight information) of a plurality of search terms included in a plurality of items of relationship information stored in the search term relationship DB 102 on the basis of the plurality of items of relationship information and sets the search terms as nodes, thereby being able to create a directed weighted graph having, as edges, forward relationship obtained by applying the distances (distance values or distance weight values) according to the relationship information to the distances between different nodes (or search paths connecting different nodes).

For example, the directed weighted graph may be configured such that directed weighted graph includes an input search term and a following search term as nodes and includes the relationship between the input search term and the following search term as a forward edge and the distance weight value between the input search term and the following search term is set in the edge.

In this case, the search path extractor 113 can store the directed weighted graph in the search path DB 104.

Further, the search path extractor 113 can select a certain search path as a start node in accordance with a preset algorithm in the directed weighted graph and can select N nodes having a high degree of relative importance of nodes connected forward within L hops from the start node as end nodes in accordance with the preset algorithm.

The degree of relative importance between other nodes that are different from each other based on the start node may use a pagerank algorithm for finding the degree of importance of a webpage.

Further, the search path extractor 113 can create search path information for each of one or more search paths connecting the start node and one or more end nodes, which are selected on the basis of the selected start node, for each of the end nodes.

Further, the search path extractor 113 can check one or more end nodes corresponding to the start node in accordance with the algorithm while changing the start node, calculate preset K search paths in order of short distance of search paths (or short entire distance of search paths) of the search paths connecting the start node and the end nodes, and then create the search path information for each of the calculated search paths.

Further, the search path extractor 113 can create path list information (search path list information) including one or more items of search path information in which a start node and an end node are the same. That is, the search path extractor 113 can create path list information by grouping one or more items of search path information in which a start node is a first search term and an end node is a second search term.

Further, as shown in FIG. 7, the search path extractor 113 can request a statistic for each of preset items for each of a plurality of search terms included in the path list information from an external server, which provides the search engine when creating the path list information, by communicating with the external server, and can create statistic list information on the basis of the statistic for each of items collected (received) for each of the plurality of search paths from the external server.

In this case, the preset items may include a search volume, an advertising unit price, and competition index, etc., and the search path extractor 113 can store search volume information in the search volume DB 105 included in the service providing apparatus 100 every time receiving search volume information including a statistic for each of preset items from the external server for each of the search terms.

In this case, when the search engine is included in the service providing apparatus 100, the controller 10 of the service providing apparatus 100 may further include a search volume creator that creates the search volume information in linkage with the search engine, and the search volume creator can store search volume information in the search volume DB 105 every time search volume information is created for each of the plurality of search terms in linkage with the search engine.

In this case, the search volume creator may be included in a search path manager 110 that is described below. The search volume creator can request a statistic for each of preset items for each of a plurality of search terms included in the search path information by communicating with the external server, and accordingly, can create and storing search volume information including the statistic for each of items received from the external server in the search volume DB. Further, the search volume information may include a search term and the statistic for each of items corresponding to the search term.

Further, the search path extractor 113 can match and store statistic list information corresponding to the path list information and the path list information in the search path DB 104.

Further, the search path extractor 113 can check the search volume of a search term corresponding to an end node in one or more items of search path information, in which their start nodes and end nodes are the same, and exclude the search path information corresponding to the end node of which the search volume is 0 from the path list information.

Further, the search path extractor 113 checks the statistic of each of preset items of each of one or more search terms included in search path information for each of one or more items of search path information included in the path list information on the basis of the statistic list information, and averages the statistics for respective search terms checked for the preset items, thereby being able to create statistics information including an average value of the statistics for each item.

For example, the statistics information may include a search volume average value for a plurality of search terms included in specific search path information, an advertising unit price average value for the plurality of search terms included in the specific search path information, a competition index average value for the plurality of search terms included in the specific search path information, etc.

Further, the search path extractor 113 can match and store the statistics information with search path information corresponding to the statistics information in the search path DB 104 when creating the statistics information.

In this case, the search path extractor 113 can set an inherent identifier in the search path information when creating search path information, and sets a corresponding inherent identifier also in statistics information matched with the search path information, thereby being able to match the search path information and the statistics information.

Alternatively, the search path extractor 113 may store the statistics information together with search path information corresponding to statistics information in the search path DB 104.

An example for this is described with reference to FIG. 7, as shown in the figures, when 'women's perfume recommendation' is selected as a start node (start search term), the search path extractor 113 selects 'subtle women's perfume' as an end node (end search term) in accordance with the algorithm, thereby being able to create a plurality of items of search path information respectively corresponding to a first search path ('women's perfume'→'women's perfume recommendation ranking 2021'→'subtle women's perfume') and a second search path ('women's perfume'→'20's women's perfume ranking 2021'→'subtle women's perfume') that connect the start node and the end node on the basis of the directed weighted graph, and then create path list information including the plurality of items of search path information.

Further, the search path extractor 113 recognizes a plurality of search terms included in the path list information on the basis of one or more items of search path information included in the path list information in linkage with the external server, and collects a statistic for each of items for each of the plurality of search terms, thereby being able to create statistic list information.

Further, the search path extractor 113 can calculate a search volume average value (347), an advertising unit price average value (0.44), and a competition index average value (0.95) by checking a statistic for each of a plurality of preset items of each of a plurality of search terms including 'women's perfume', 'women's perfume recommendation ranking 2021', and 'subtle women's perfume' on the basis of first search path information corresponding to the first search path included in the path list information and statistic list information corresponding to the path list information, create first statistics information including the calculated search volume average value, advertising unit price average value, and competition index average value, and match and store the first statistics information with the first search path information in the search path DB 104.

Similarly, the search path extractor 113 can calculate second statistics information including a search volume average value (373), an advertising unit price average value (0.34), and a competition index average value (0.91) on the basis of second search path information, which corresponds to the second search path included in the path list information, and statistic list information, and then match and store the second statistics information with the second search path information corresponding to the second statistics information in the search path DB 104.

Meanwhile, when receiving request information (search request information) including a requested search term and a ranking condition from a user terminal, the optimal path recommender 114 can create and provide recommendation list information (recommendation path list information), in which one or more items of search path information including the requested search term are arranged on the basis of the ranking condition and statistics information, to the user terminal.

In this case, the service providing apparatus 100 may include a user input unit for receiving user input, and the optimal path recommender 114 included in the controller 10 can receive the request information on the basis of user input through the user input unit.

In this case, various conditions such as a search volume, an advertising unit price, a competition index, a feature, and whether or not existing may be set as the ranking condition.

That is, when receiving the request information from the user terminal, the optimal path recommender 114 can extract one or more items of search path information and one or more items of statistics information, which correspond to the requested search term included in the request information, from the search path DB 104, calculate grades in accordance with a preset grade calculation reference for each of one or more items set in the ranking condition included in the request information for the extracted one or more items of statistics information and then arrange the extracted one or more items of statistics information in order of grade, select one or more items of search path information corresponding to statistics information over a preset reference ranking of one or more items of search path information respectively corresponding to the arranged one or more items of statistics information, and provide recommendation list information including the selected one or more items of search path information to the user terminal.

In this case, the optimal path recommender 114 can calculate the ranking of statistics information by comparing the grade calculated for the statistics information corresponding to the search path information with the grade (s) of another (other items of) statistics information, determine a ranking for each of one or more search paths corresponding to the request information in a ranking determination method of determining the calculated ranking as the ranking of the search path information corresponding to the statistics information, and select one or more items of search path information over a preset reference ranking of one or more items of search path information corresponding to the request information.

In the configuration described above, the optimal path recommender 114 may extract only one or more items of search path information having the requested search term as an end node from the search path DB 104, and create recommendation list information for the extracted one or more items of search path information.

That is, the optimal path recommender 114 can create recommendation list information by selecting a search path composed of only one or more search terms required to reach the requested search term as a recommendation search path.

Further, the optimal path recommender 114 may put at least one of statistic information that corresponds to search path information, search volume information that includes a statistic for each of items for each of a plurality of search terms included in the search path information, and feature information for the feature of response results respectively corresponding to a plurality of search terms included in the recommendation search path information, into the recommendation list information to correspond to each of one or more items of search path information included in the recommendation list information, and then provide the recommendation list information to the user terminal in a UI or API type.

In this case, the optimal path recommender 114 may create, in a UI type or an API type, analysis result information, which includes the recommendation list information and includes at least one of statistic information that corresponds to search path information, search volume information that includes a statistic for each of items for each of a plurality of search terms included in the search path information, and feature information for the feature of response results respectively corresponding to a plurality of search terms included in the recommendation search path information for each of one or more items of search path information included in the recommendation list information, and provide the analysis result information to the user terminal.

To this end, the optimal path recommender 114 can provide one or more items of statistics information respectively corresponding to one or more items of search path information included in the recommendation list information together with the recommendation list information and then provide the recommendation list information to the user terminal such that specific statistics information corresponding to specific search path information selected by a user from the one or more items of search path information included in the recommendation list information is displayed together with the specific search path information on the user terminal.

Further, the optimal path recommender 114 can request a statistic for each of preset items for a plurality of search terms included in the recommendation list information from the external server, create statistic list information on the basis of the statistic for each of items collected (received) from the external server for a plurality of search terms corresponding to the recommendation list information, and then provide the statistic list information together with the recommendation list information to the user terminal. In this case, the preset items may include a search volume, an advertising unit price, and a competition index, etc.

In this case, the optimal path recommender 114 may extract search volume information for each of a plurality of search terms included in the recommendation list information from the search volume DB 105, and may create the statistic list information on the basis of the extracted search volume information for each of the plurality of search terms, and then provides the statistic list information together with the recommendation list information to the user terminal.

Accordingly, the user terminal can display specific search path information selected by a user from the one or more items of search path information included in the recommendation list information when receiving the recommendation list information, and when a specific search term included in the specific search path information is selected by the user, the user terminal can display and provide the statistic for each of items (or search volume information) relevant to the specific search term.

As an example of the above description, as shown in FIG. 8, when receiving request information and receiving 'Anbang grill' that is a requested search term according to the request information and 'advertising unit (CPC) order' that is a ranking condition according to the request information, the optimal path recommender 114 can obtain one or more items of search path information corresponding to the requested search term 'Anbang grill' as recommendation search path information from the search path DB 104, and then obtain one or more items of statistics information respectively corresponding to the one or more items of recommendation search path information as interest statistics information from the search path DB 104.

Further, the optimal path recommender 114 can create and return the one or more items of recommendation search path information in an Application Programming Interface (API)

type in order or advertising unit price that is a ranking condition on the basis of the one or more items of interest statistics information.

For example, in 'grill'→'grill'→'grill recommendation'→'Anbang grill'→'Anbang grill 501'→'Anbang grill ab301mf'→'fish grill' that is a first recommendation search path having the highest ranking in the recommendation list information, when the CPC values of the search terms 'grill', 'Grill', 'grill recommendation', 'Anbang grill', 'Anbang grill 501', 'Anbang grill ab301mf', 'fish grill' are 2.503594, 0.119853, 0.127498, 0.248646, 0, 0.118544, 0.28, respectively, it is possible to calculate (return) 0.4854, which is the average of the CPC values of the search terms included in the first recommendation search path, as the grade of the first recommendation search path. Further, it is also possible to calculate grades for other recommendation search paths included in the recommendation list information in the same method as the method of calculating the grade of the first recommendation search path, and arrange the one or more recommendation search paths included in the recommendation list information in order of grade.

In this case, the optimal path recommender 114 can check the average value of the CPC values of search terms included in the first recommendation search path in statistics information (interest statistics information) corresponding to the first recommendation search path, and calculate the average value as a grade.

Further, in the configuration described above, the optimal path recommender 114 obtains one or more items of search path information corresponding to the requested search path as recommendation candidate path information from the search path DB 104, calculates a grade for the one or more items of recommendation candidate path information, respectively, as described above, selects one or more items of recommendation candidate path information of which the calculated grades are equal to or larger than a preset reference value as recommendation search path information, and puts only the selected recommendation search path information into the recommendation list information, thereby being able to provide corresponding recommendation list information to the user terminal as a final result (final result information) corresponding to the requested information.

Accordingly, the optimal path recommender 114 can provide only search paths having high relevance with the requested search term and the ranking condition together with the final result such that search paths having low relevance with the requested search term and the ranking condition are excluded from the final result.

Figure 9:
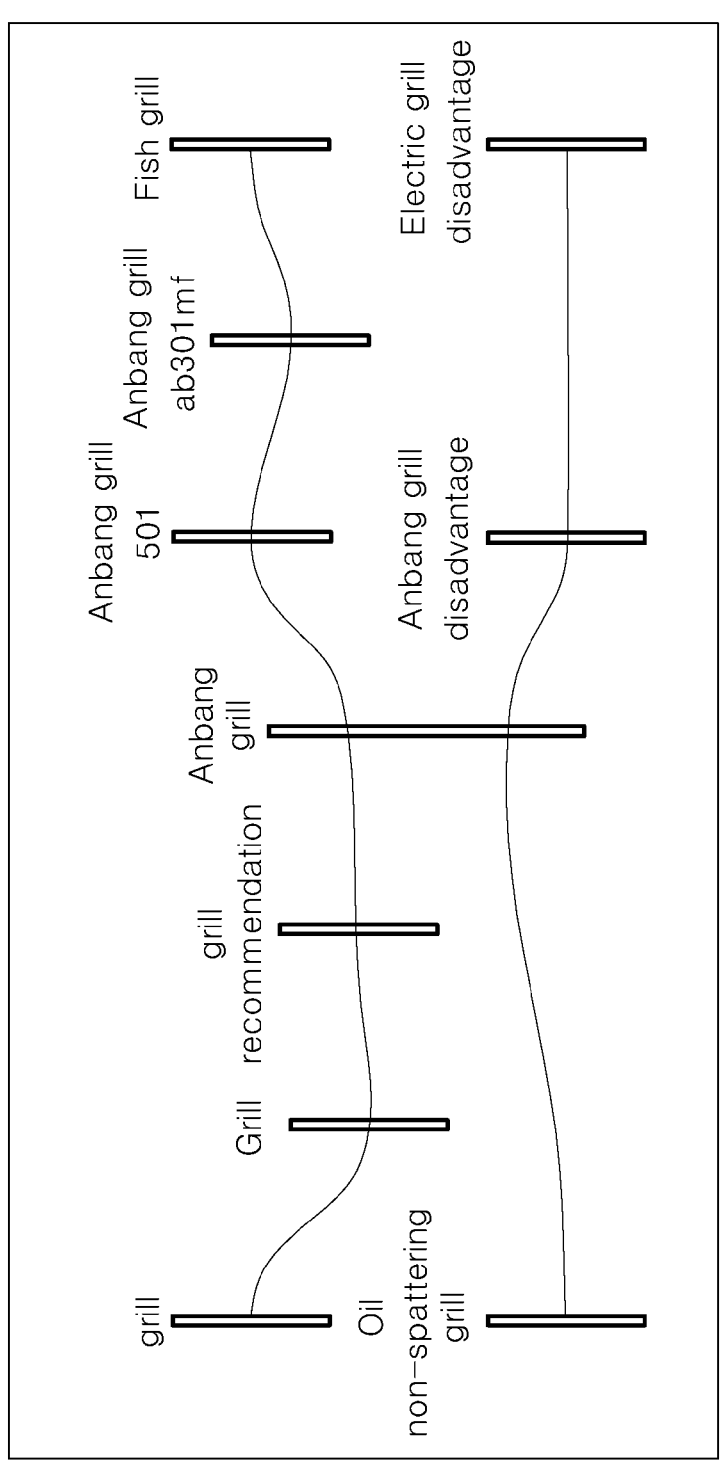
FIG. 9 is an exemplary diagram showing the service providing apparatus according to an embodiment of the present disclosure providing a recommended search path word network UI.

Further, as shown in FIG. 9, when 'Anbang grill' that is a requested search path and 'order of advertising unit price (CPC) order' that is a ranking condition are received, the optimal path recommender 114 can diagram and output a work network UI on the basis of the recommendation list information obtained in correspondence to the requested search term.

For example, when first recommendation search path information included in recommendation list information obtained in correspondence to the request information is 'grill'→'Grill'→'grill recommendation'→'Anbang grill'→'Anbang grill 501'→'Anbang grill ab301mf'→'fish grill' and second recommendation search path information included in the recommendation list information is 'oil non-spattering grill'→'Anbang grill'→'Anbang grill disadvantage'→'electric grill disadvantage', the optimal path recommender 114 expresses the search terms in boxes, disposes a previous search term for a specific node 'Anbang grill' corresponding to the requested search term on the path at the left of the specific node, and disposes a following search term of the specific node at the right of the specific node, thereby being able to create and provide recommendation list information configured as a UI of a flow diagram type in which different nodes (search terms) are connected by an edge in accordance with the first and second recommendation search path information.

Further, the optimal path recommender 114 can express the height of the boxes as the size (or the number) of an incoming edge or an outgoing edge of the search terms or can express the colors of the boxes as information (search volume, advertising unit price, competition index, etc.) of the search terms on the paths.

Figure 10:
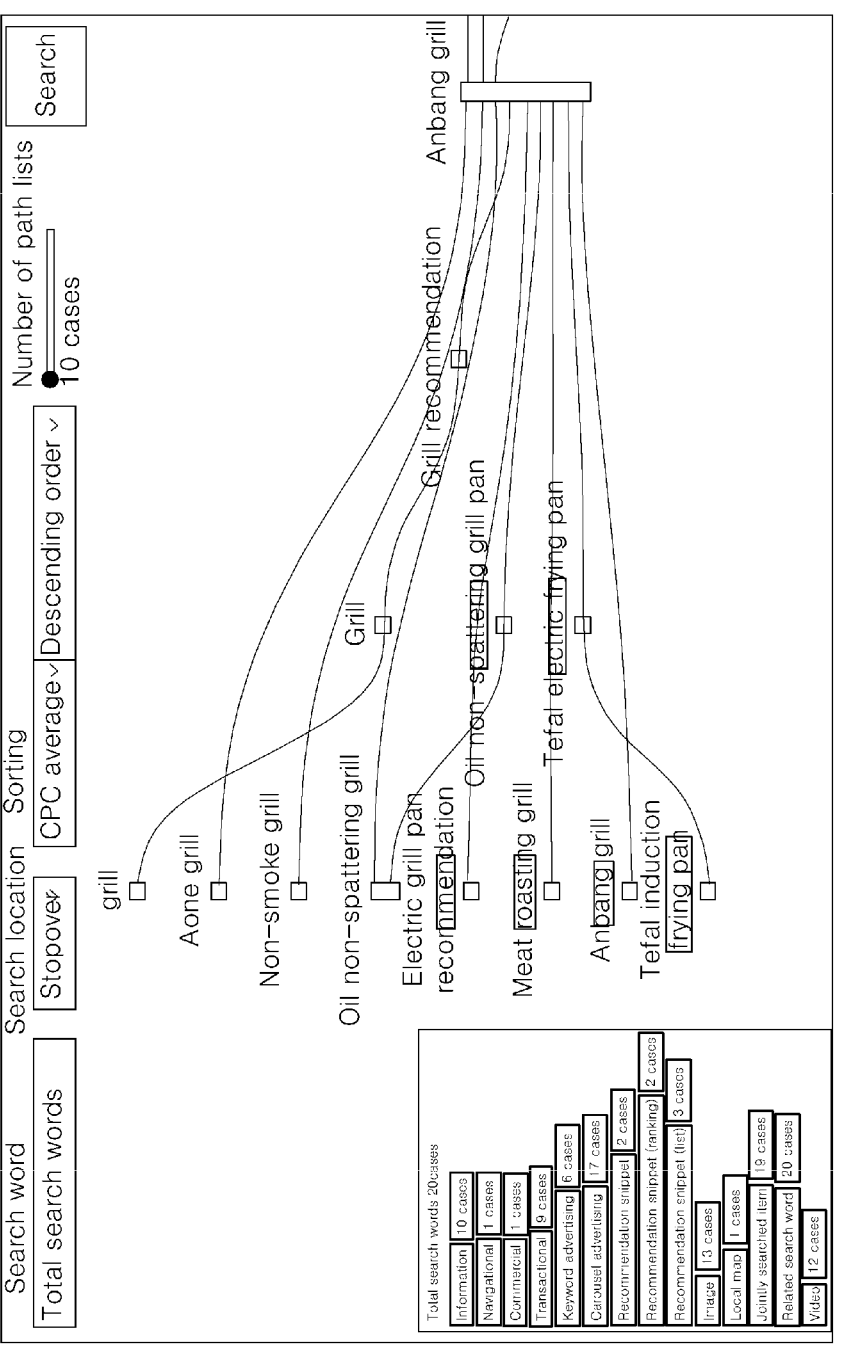
FIG. 10 is an exemplary diagram of a node highlighting function in the recommended search path word network UI of the service providing apparatus according to an embodiment of the present disclosure.

Further, as shown in FIG. 10, the optimal path recommender 114 can provide feature information, which corresponds to a plurality of search terms included in the recommendation list information, together with the recommendation list information to a user terminal by extracting the feature information from the feature DB 103 for each of the search terms and then matching the feature information with the search terms such that when a UI according to the recommendation list information is displayed on the user terminal, one or more boxes respectively corresponding to one or more search terms corresponding to a specific feature selected by a user can be highlighted and displayed or one or more boxes respectively corresponding to the other search terms excluding the one or more search terms corresponding to the specific feature can be filtered and displayed.

As described above, the present disclosure expands a search term by obtaining related search terms relevant to a basic search term by applying every basic search term, which is obtained while different characters are added to a keyword, to a search engine, obtains the degree of relevance between input search terms and one or more following search terms, which are obtained on the basis of a search result searched through a search engine by applying the expanded search terms as the input search terms, as a distance according to search intension figured out by the search engine and the exposure rankings of the following search terms, and creates a search path by connecting search terms having a distance to each other on the basis of the distance between the search terms and then provides a recommendation search path list relevant to a requested search term by a user and an advertisement property that the user considers as being important, thereby being able to provide support to be able to easily select and use, in marketing, related search terms having the highest relevance with the requested search term by the user and having high advertisement efficiency of search terms on paths for reaching the requested search term by the user through the recommendation search path list.

Further, the present disclosure an optimal search path corresponding to a requested search term by a user in a UI or API type, thereby being able to support the user to be able to easily obtain a search term list suitable for advertising/marketing, search information about search terms (search volume, advertising unit price, degree of advertisement competition, etc.), and feature information.

Further, the present disclosure expresses connection relationship between search terms beyond the level of simply providing related search terms through a word network UI created on the basis of search paths, whereby it is possible to provide main search procedures for products or services by users such that they can find the procedures, and in addition, to support users to be able to more intuitively find their needs about what they request and what they compare.

Meanwhile, the service providing apparatus according to the present disclosure can provide a visualized search term network that supports a user to be able to easily discriminate and select a search term, which corresponds to his/her desired search condition, from other search terms on the basis of search path information created as described above, which is described in detail hereafter with reference to drawings.

First, as shown in FIG. 1, the controller 10 may include a search path manager 110 including the search term expander 111, the search information extractor 112, the search path extractor 113, and the optimal path recommender 114, and a search result provider 120 creating and providing search term network information relevant to a search network on the basis of a search paths created through the search path manager 110.

The search path manager 110, as described above, can create and store search path information in a search path DB for each of one or more search paths connecting a start node and an end node determined in accordance with a preset algorithm by setting a plurality of search terms as nodes on the basis of a plurality of items of relationship information stored in the search term relationship DB.

In this case, the search path information may include a plurality of nodes connected through connection lines, a plurality of search terms set to correspond to the plurality of nodes, respectively, connection lines (edges) connecting adjacent nodes to each other, etc.

Further, the search result provider 120 can extract one or more items of search path information, which includes a requested search term, from the search path DB when search term network request information including the requested search term and a search condition are received from a user terminal, and can create search network information about a search term network connecting different search terms having a distance on the basis of the extracted one or more items of search path information.

Further, the search result provider 120 makes a plurality of different search term groups for the search network information in accordance with a preset grouping algorithm and then sets different properties so that the plurality of different search term groups can be visually discriminated, thereby being able to providing the created search network information to the user terminal.

For example, the search result provider 120 can receive search term network request information including a requested search term and a search condition, in which a connection direction with another node and the number of hops are set on the basis of a node corresponding to the requested search term, from the user terminal.

In this case, the connection direction may mean the connection direction of a connection line (edge) connecting a specific node and another node constituting a search path and corresponding to the requested search term, and at least one or a forward direction and a backward direction can be selected as the connection direction.

Further, the hop may mean the number of nodes forming a path by being sequentially connected to a specific node, which corresponds to the requested search term, around the specific node.

Accordingly, when a search condition in which the forward direction and the backward direction are both selected as the connection direction and two hops are set as the number of hops is received, the search result provider 120 can extract search path information, which includes the requested search term and is composed of a plurality of nodes connected within 2 hops forward or backward from a node corresponding to the requested search term of one or more items of path information stored in the search path DB, from the search path DB.

In this case, the search result provider 120 can recognize search path information, which includes the requested search term and includes a node exceeding 2 hops from the requested search term of the one or more items of search path information, from the search path DB, and can extract the recognized search path information from the search path DB with the node exceeding 2 hops from the requested search term removed from the recognized search path information.

Meanwhile, the search result provider 120 extracts one or more items of search path information corresponding to the search term network request information from the search path DB, creates a search term network on the basis of the extracted one or more items of search path information, makes a plurality of different search term groups for the search term network in accordance with a preset grouping algorithm, and then sets different properties so that the plurality of different search term groups can be visually discriminated from each other, thereby being able to provide the created search term network to the user terminal.

In this case, the search result provider 120 can create a search interface including the search term network and transmit search interface information about the search interface to the user terminal.

The search term network described in the present disclosure may be search network information and the search interface including the search term network may be configured in a UI type. Further, the search interface including the search term network may be configured as search term network information. Further, the search interface may mean a search term network (search term network information) configured in a UI type.

An example of the above description is described hereafter with reference to drawings.

First, as shown in FIG. 11, the search result provider 120 can provide data relevant to a search interface that can create search term network request information for search term network request to the user terminal, and can receive search term network request information created on the basis of the search interface from the user terminal.

Further, when search term network request information in which a forward direction and a backward direction are both set as the connection direction and which includes a search condition in which 2 hops are set as the number of hops and includes 'men's slacks' as a requested search term, is received, as shown in the figure, the search result provider 120 can extract one or more items of search path information satisfying the requested search term and the search condition according to the search term network request information from the search path DB.

Figure 12:
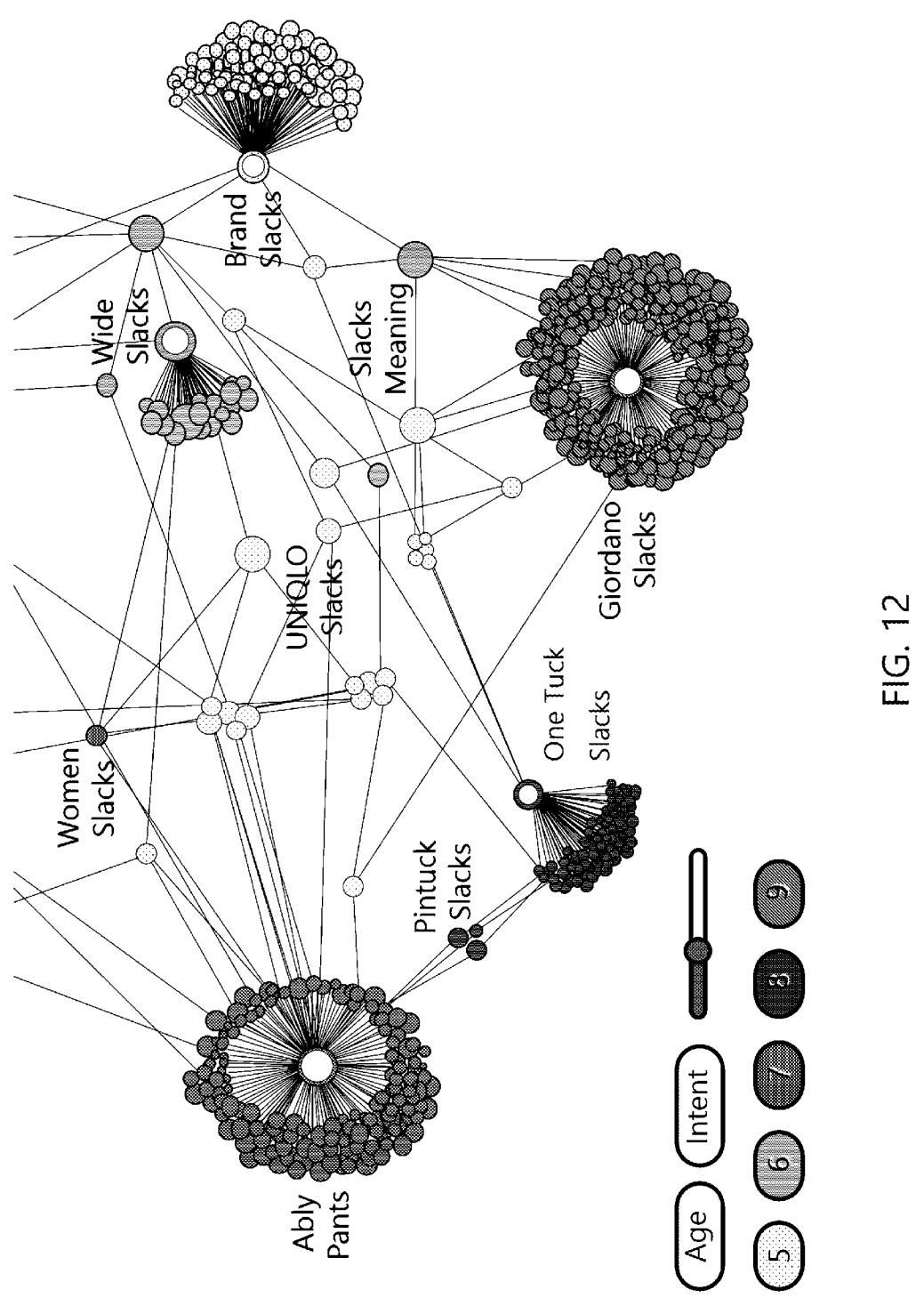
FIGS. 12 to 13 are exemplary diagrams of a search term network created in the service providing apparatus according to an embodiment of the present disclosure.

Thereafter, as shown in FIG. 12, the search result provider 120 can create a search term network connecting different search terms having a distance (through connection lines) by extracting one or more items of search path information satisfying the requested search term and the search condition, applying the extracted one or more items of search path information to ForceAtlas2 algorithm, and using inter-search term relationship according to the extracted one or more items of search path information, and can create a search term network grouped in a plurality of different search term groups by applying the search term network to louvain algorithm.

In this case, the search result provider 120 can create a search term network on the basis of a plurality of search terms included in search path information and the distances between the plurality of search terms, and can create a search term network by combining the same search terms between a plurality of items of different search path information into one node.

Further, the search result provider 120 can group search terms in the way of grouping search terms having high connection density using a community detection technique in accordance with louvain algorithm for the search term network.

In this case, the search result provider 120 can create a search term network, in which different properties are set between search term groups, by giving inherent numbers and inherent colors to the different search term groups to easily discriminate the different search term groups.

That is, the search result provider 120 can create a search term network, in which different properties are set between search term groups, by setting different numbers or colors for different search term groups.

Further, the search result provider 120 obtains a search volume for each of a plurality of search terms included in the search term network from search volume information stored in a search volume DB or a search engine or an external server in linkage with the search path manager 110, thereby being able to check search volumes respectively corresponding to the plurality of search terms included in the search term network. Further, the search result provider 120 determines the size of nodes corresponding to search terms in accordance with the search volume of the search terms, thereby being able to change (adjust) the size of corresponding nodes included in the search term network.

Further, the search result provider 120 can check one or more surrounding nodes connected with a specific node corresponding to a search term for each of search terms included in the search term network, calculate a network centrality index of the search term corresponding to the specific node in consideration of the centrality of the specific node according to the number of surrounding nodes and the positions of the surrounding node and the distances between the specific node and the surrounding nodes, and create a search term network set in which the nodes of search terms having a network centrality index equal to or larger than a preset reference value and the nodes of search terms having a network centrality index less than the reference value are set to be discriminated in accordance with a network centrality index calculated for each of the search terms.

In this case, the network centrality, which is a barometer showing how much the nodes in a network are close to the center of the network, shows the degree of importance in the network function of each node and may be calculated as an index.

Further, it is possible to calculate the network centrality index using at least one of a plurality of calculation methods that is generally used to calculate the network centrality index such as the connection centrality (degree centrality), betweenness centrality, closeness centrality, and pagerank.

Accordingly, the search result provider 120 can use the network centrality index to easily find an important search term on a visualized search term network by specifically expressing a node corresponding to a search term having high centrality on a search term network.

For example, the search result provider 120 can set an important node, which corresponds to a search term of which the network centrality index is equal to or larger than a preset reference value, in a doughnut shape on the search term network, and can set a node having a network centrality index less than the reference value to have a shape different from the shape of the important node such as common circle or rectangle.

Accordingly, the search result provider 120 can provide a search term network so that a user can easily discriminate a search term having high influence on a search term network by checking a shape corresponding to an important node and the size of each node by setting nodes in accordance with a search volume and a centrality index.

Figure 13:
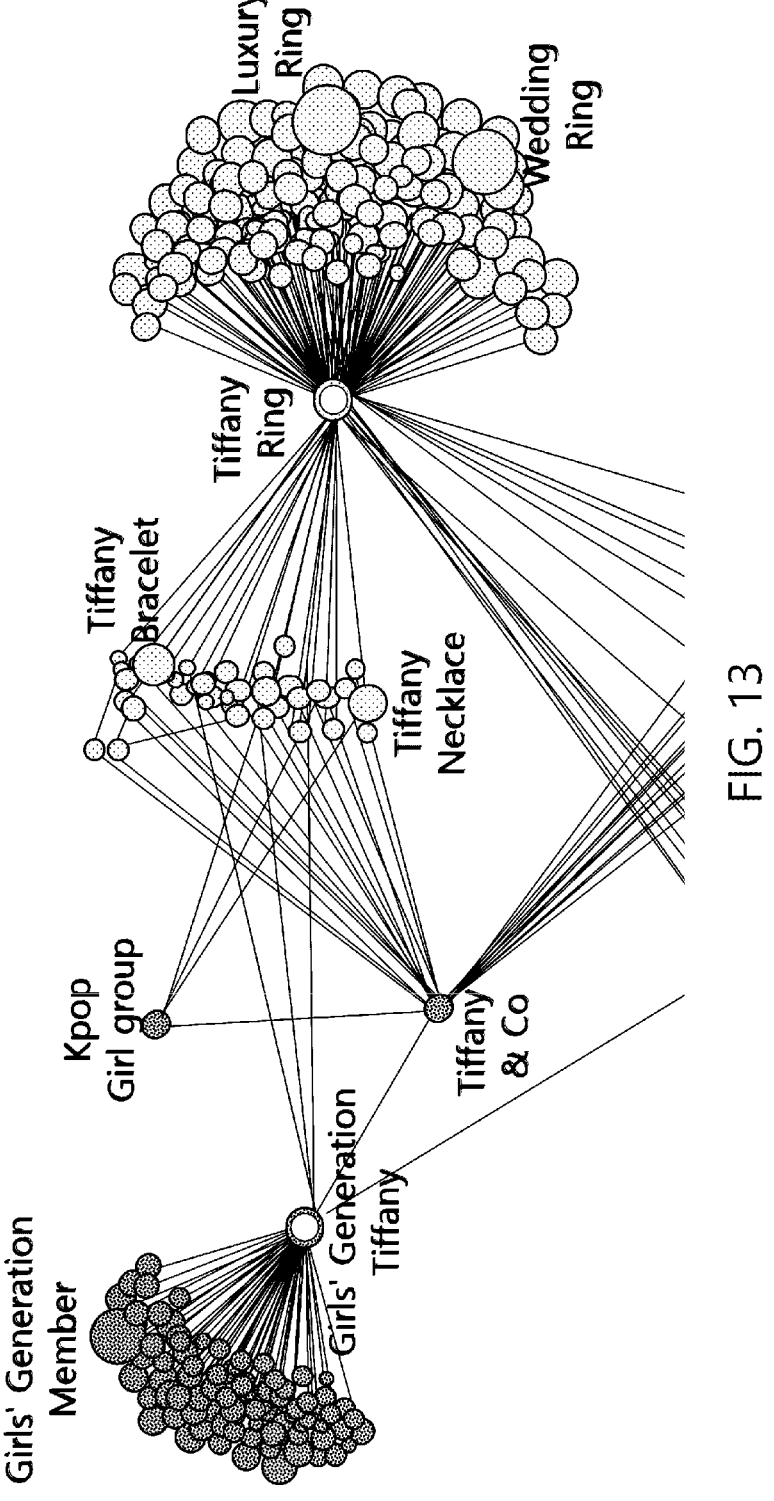

In particular, the search term network shown in FIG. 13 is a search term network created for a requested search term different from that in FIG. 12. As shown in the figure, it can be seen that the search result provider 120 can discriminate related search terms of 'Tiffany' from 'girl's generation' and related search terms of 'Tiffany' that is a jewelry brand into different groups in accordance with a distance, so it is possible to accurately select other search terms, which pertains the same category as a requested search term of a category that a user wants and has high relevance with the requested search term, and group and provide other search terms with the requested search terms, and it can be seen that it is possible to provide a search term network such that a user can easily discriminate a main search term and a search term having high influence among surrounding search terms having high relevance with the main search term on the basis of a shape corresponding to an important node and the size of each node in accordance with node setting based on a search volume and a network centrality index.

Further, the search result provider 120, as described above, can transmit a search term network, which is created as a response to search term network request information received from a user terminal, to the user terminal, and for example, can create a search interface including the search term network in a webpage type and then transmit the search interface to the user terminal.

According to the configuration described above, as shown in FIG. 12, the service providing apparatus 100 according to the present disclosure can provide a search term network, in which a user can easily recognize and discriminate a search term group composed of one or more other search terms of which relevance with a requested search term by the user is a predetermined level or higher, to the user by grouping a plurality of search terms having high relevance with each other on the basis of the distance between search terms according to search path information such that it is possible to clearly check especially search terms of which the search volume is a predetermined level or higher among search terms having high relevance with the requested search term through the search term network, thereby being able to provide support to be able to easily find search terms, which have high marketing efficiency and are not severely competitive in term of price, among search terms positioned around the requested search term.

Meanwhile, in the configuration described above, the search result provider 120 can transmit various items of additional information to the user terminal by setting the additional information in the search term network in accordance with an additional search condition (or search setting condition) set by a user through a search interface including the search term network, which is described in detail.

First, when sex is selected as the additional search condition through the search interface, the search result provider

120 can receive additional search request information (or additional search condition information) for an additional search condition including the sex from the user terminal.

Accordingly, when the additional search request information is received, the search result provider 120 checks the sex set as the additional search condition, checks the degree of interest such as a search volume and a conversion rate of each of men and women for each of a plurality of search terms constituting the search term network by communicating with an external server providing the search engine, and sets the sex having a higher degree of interest among men and women to a node corresponding to a search term, thereby being able to create and transmit a search term network, in which sex having the highest degree of interest is set for each search term (or node), to the user terminal.

Further, when additional search request information about the additional search condition in which an age range is set is received, the search result provider 120 checks the age range set as the additional search condition, checks the degree of interest such as a search volume and a conversion rate of each of a plurality of different age ranges for each of a plurality of search terms constituting the search term network by communicating with an external server providing the search engine, and sets the age range having a higher degree of interest to a node corresponding to a search term, thereby being able to create and transmit a search term network, in which an age range having the highest degree of interest is set for each search term (or node), to the user terminal.

In this case, the search result provider 120 can create and transmit a webpage, which includes a search term network in which the age range or the sex is set, to the user terminal.

Further, the additional search condition may be included in the search term network request information, and the search result provider 120 can set and transmit the sex or age range to the user terminal by setting the sex or age range for each of nodes included in a search term network corresponding to the search term network request information when transmitting the search term network.

Meanwhile, when a request relevant to the additional search condition for the search intention of each search term is received from the user terminal, the search result provider 120 can create and provide the search term network in which the search intention of each search term by checking the search intention of each search term, which is described in detail.

First, when a user selects search intention as an additional search condition through a search interface, the search result provider 120 can receive additional search request information, in which the search intention is seat as an additional search condition, from a user terminal.

Figure 14:
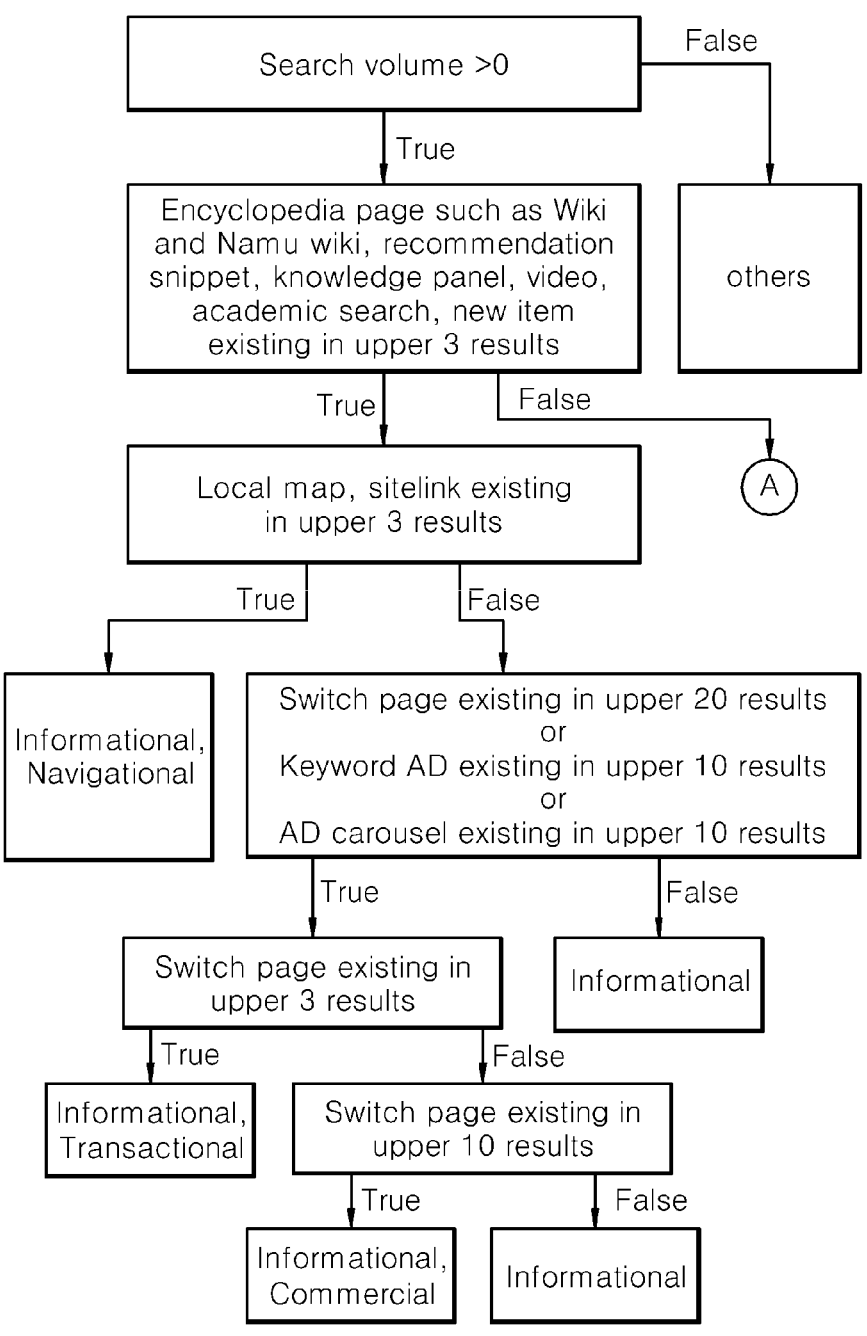
FIGS. 14 to 17 are exemplary diagrams showing a process of creating a search term network including a search intention by the service providing apparatus according to an embodiment of the present disclosure.
Figure 15:
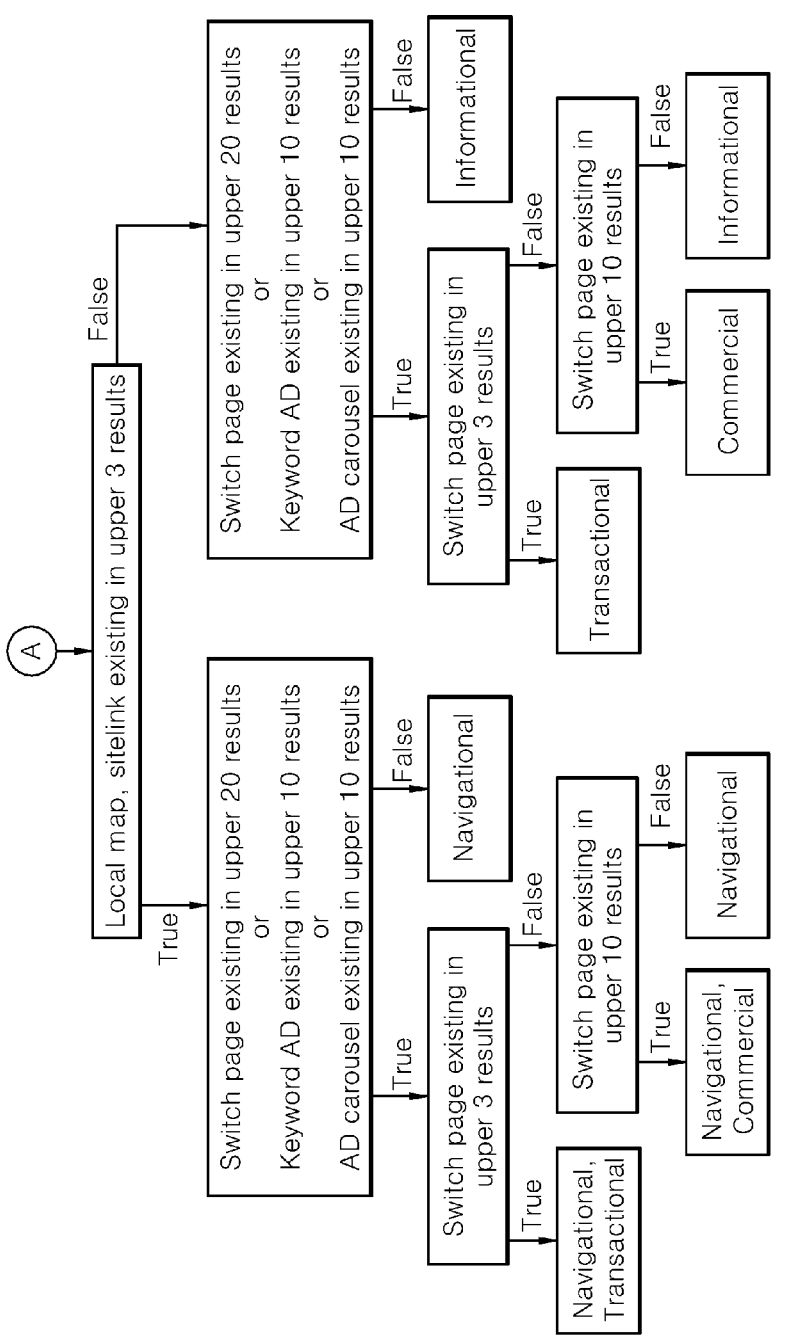

Further, as shown in FIGS. 14 and 15, when additional search request information in which the search intention is set as an additional search condition is received, the search result provider 120, on the basis of respective search intention determination conditions for a plurality of steps set in advance to figure out search intention in one or more search result pages converted by applying a search term included in the search term network to the search engine as input search term, checks whether one or more preset search result items (each search result item) according to the search intention determination condition exist in upper N search results, and simultaneously, recognizes a search intention determination condition for each of one or more steps, which the one or more search result pages satisfy, among the respective search intention determination conditions for a plurality of steps; and puts preset search intention into a search term network by setting the preset search intention to the search term to correspond to the recognized search intention determination condition for each of one or more steps (search intention determination condition for each of one or more steps that the one or more search result pages satisfy) among a plurality of preset search intentions, thereby being able to set search intention for each of search terms pertaining to the search term network.

In this case, the plurality of search intentions may be determined into a total of four types of informational, navigational, commercial, and transactional.

Further, the search result page is a webpage including a search result searched on the basis of an input search term by the search engine, and the search result page may be search result list information described above.

Figure 16:
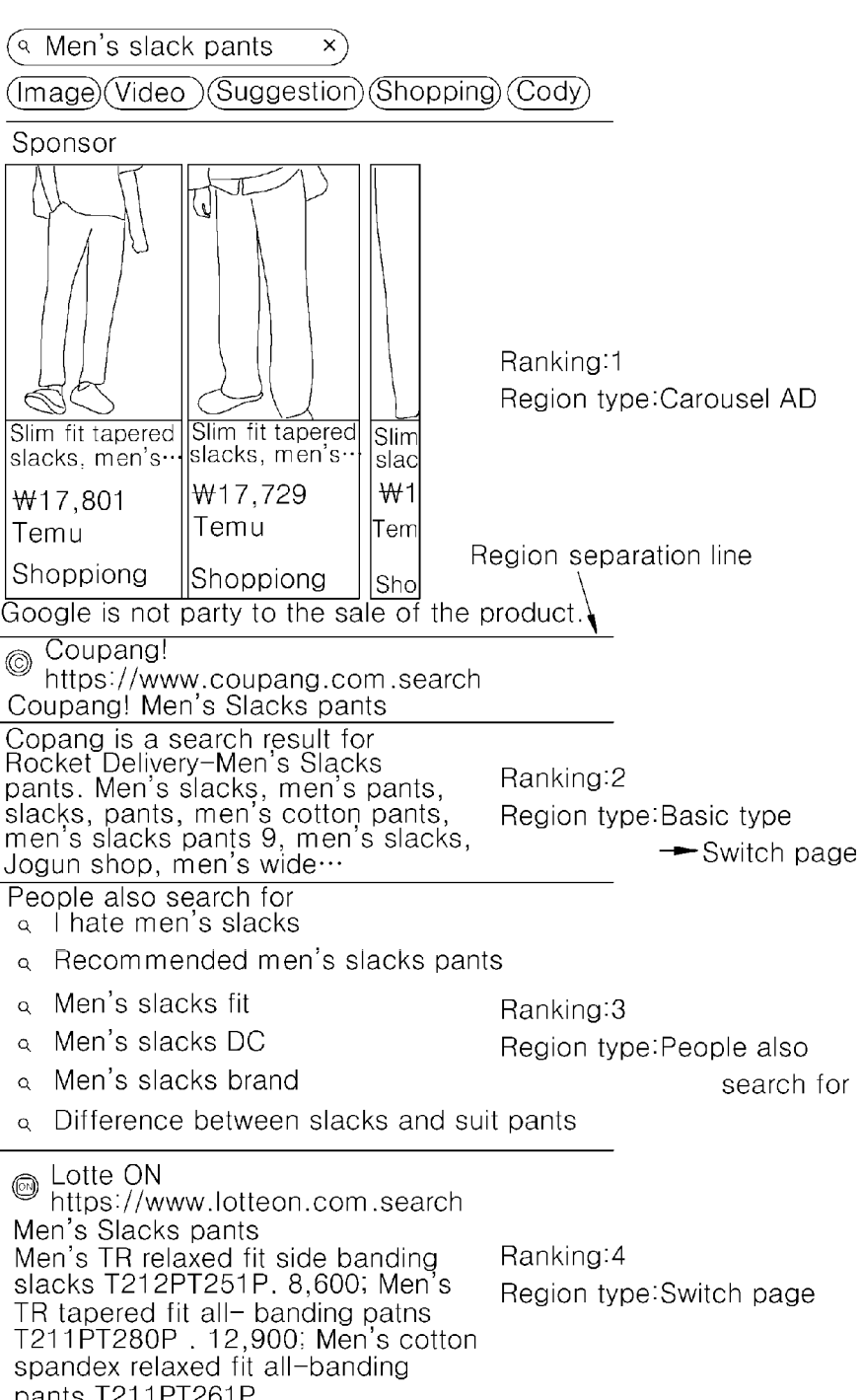
Figure 17:
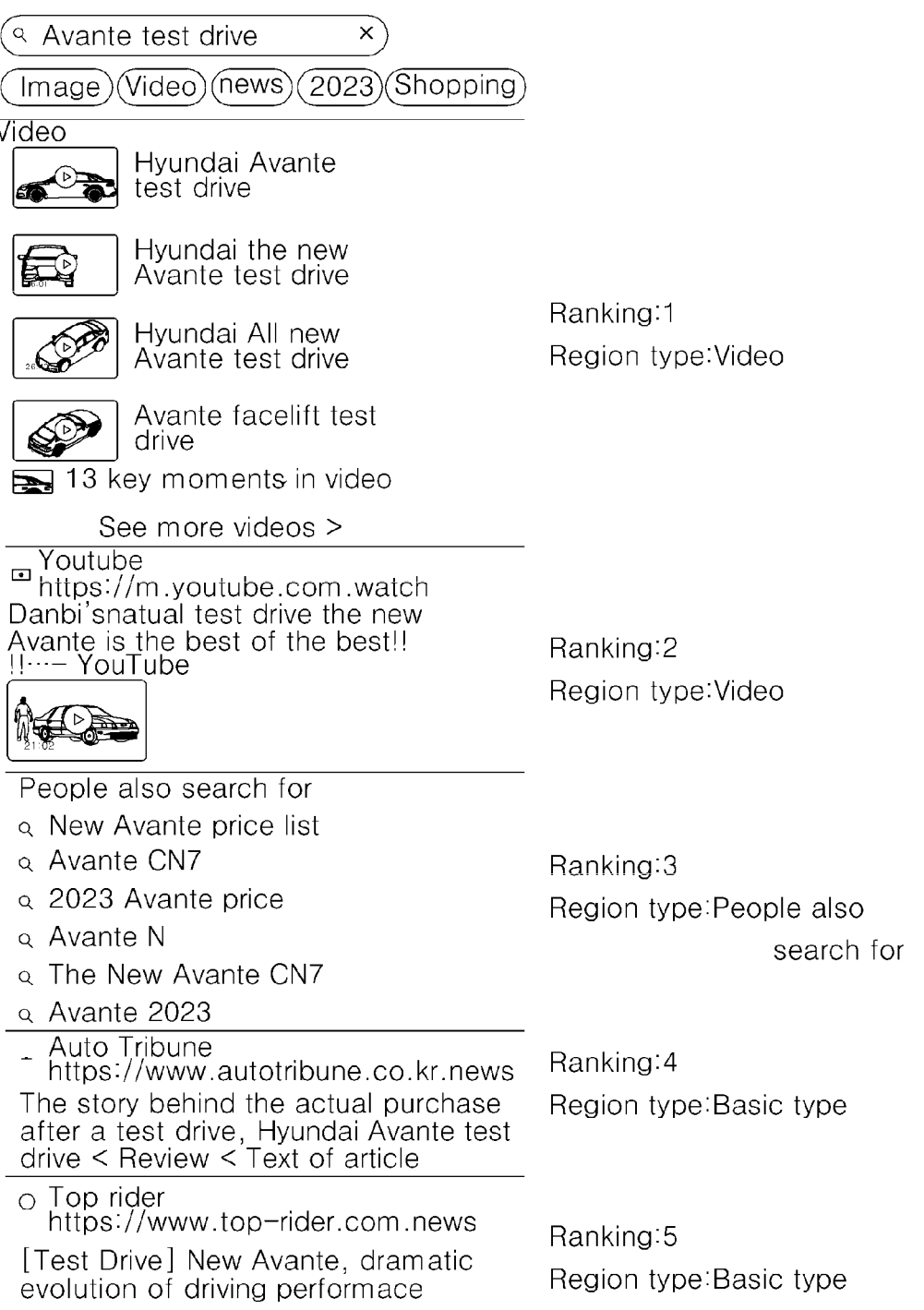

Further, as shown in FIGS. 16 and 17, the search result provider 120 can check a search result for each of a plurality of different regions included in the search result page through region separation lines provided by the search engine included in the search result page, and can recognize upper N search results in accordance with the arrangement order of a plurality of regions respectively corresponding to the plurality of search results.

Further, the search result provider 120 can set only a search term, of which the search volume exceeds 0, as search intention among search terms pertaining to a search term network.

Further, since most clicks are generated search result pages within 2 pages, the search result provider 120 can check and set search intention in a search term only for search result pages within 2 pages converted from a search engine in correspondence to the search term as a target for determining search intention.

Further, one or more search result items set in the search intention determination condition may include at least one of an encyclopedia page, a recommendation snippet, a knowledge panel, a video, academic search, a news item, a local map, a site link, an AD carousel, a keyword advertisement, and the URL of a pre-stored switch page (or a switch page).

In this case, the search result item may mean a region type of a region corresponding to a search result.

As an example of recognizing search result items of the search result, the search result provider 120 can recognize a search result including the domain of an encyclopedia (Wikipedia and Namu wiki) set in advance in a URL among search results included in a search result page as a search result item corresponding to 'encyclopedia page'.

Further, the search result provider 120 can recognize a search result item of a search result, which includes the location information of a specific place (map, phone number, etc.), as 'local map'.

Further, the search result provider 120 can recognize a search result item of a search result, which includes the information of a specific entity in an information box type, as 'knowledge panel'.

Further, the search result provider 120 can recognize a search result item of a search result, which includes a result that can be moved into video information, as 'video'.

Further, the search result provider 120 can recognize a search result item of a search result, which includes a result that can be moved into thesis and academic data, as 'academic search'.

Further, the search result provider 120 can recognize a search result item of a search result, which includes main news, as 'news item'.

Further, the search result provider 120 can recognize a search result item of a search result, which includes 'recommendation snippet information, as 'recommendation snippet'.

Further, the search result provider 120 can recognize a search result item of a search result, which includes a link result that makes it possible to move to a specific site, as 'site link'.

Further, the search result provider 120 can recognize a search result item of a search result, which includes a text and title, description, a link URL, etc. relevant to 'promotion', 'advertising', etc., as 'keyword advertising'.

Further, the search result provider 120 can recognize a search result item of a search result, which includes an advertising content such as a text and product image, a link URL, etc. relevant to 'promotion', 'advertising', etc., as 'AD carousel'.

Further, the search result provider 120 can recognize a search result item of a search result of title, description, and link URL types relevant to web/blog, etc. other than the search result items described above, as 'basic type'.

Further, the search result provider can extract only a protocol, a domain, and a path from the URL of a 'keyword advertising' region of all of the search result pages kept for a unit period in the unit of a predetermined period (or predetermined cycle) by communicating (linking) with an external server providing the search engine, and can store the a protocol, domain, and path as 'switch URL' in a separate switch page DB included in the service providing apparatus 100.

In this case, the search result provider 120 can extract and store the switch URL in the switch page DB only for search result pages within a preset past period from the current point in time, and can delete the switch URL extracted from search result pages not pertaining to the past period from the switch page DB.

Further, search result provider 120 can extract and compare the protocol, domain, and path of a URL within a search result corresponding to the basic type of search result(s) included in a search result page with the 'switch URL', and can recognize a search result item of a search result including the basic type included in a URL the same as the switch URL as 'switch page'.

As an example of the above description, the search result provider 120 can perform a process of determining whether a search intention determination condition of a preset first step according to whether an encyclopedia page such as Wiki and Namu wiki, a recommendation snippet, a knowledge panel, a video, academic search, or a new item exist in upper three results in one or more search result pages corresponding to a specific search term of which the search volume exceeds 0 is satisfied, and then can perform a process of determining whether a search intention determination condition of a preset second step according to whether a local map or a site link exists in the upper three search results is satisfied, when the search intention determination condition of the first step is satisfied.

Further, the search result provider 120 can determine (recognize) the search intention corresponding to the specific search term as informational and navigational when the search intention determination condition of the second step is satisfied.

Further, when the search intention determination condition of the second step is not satisfied, the search result provider 120 can determine whether or not satisfying search intention determination condition of a preset third step according to whether any one of whether a switch page exists in upper 20 search results, or whether keyword advertising exist in upper 10 search results, or whether an AD carousel exists in upper 10 search results in one or more search result pages is satisfied.

Further, when the search intention determination condition of the third step is not satisfied, the search result provider 120 can determine (recognize) the search intention corresponding to the specific search term as informational and can figure out the search intention of the specific search term by determining whether a search intention condition is satisfied in each of one or more following steps when the search intention determination condition of the third step is satisfied.

Further, the search result provider 120 can set search intention for each of search terms included in a search term network in the way described above, and can provide a search term network, in which the search intention for each of search terms is set, to the user terminal as a response to additional search request information in which the search intention is set as an additional search condition.

In this case, the search result provider 120 can provide a search interface, which includes the search term network in which the search intention for each of search terms is set, to the user terminal, and accordingly, one or more search terms corresponding to specific search intention selected by a user through the search interface can be displayed separately from search terms, in which search intention different from the specific search term is set, on the user terminal.

Figure 18:
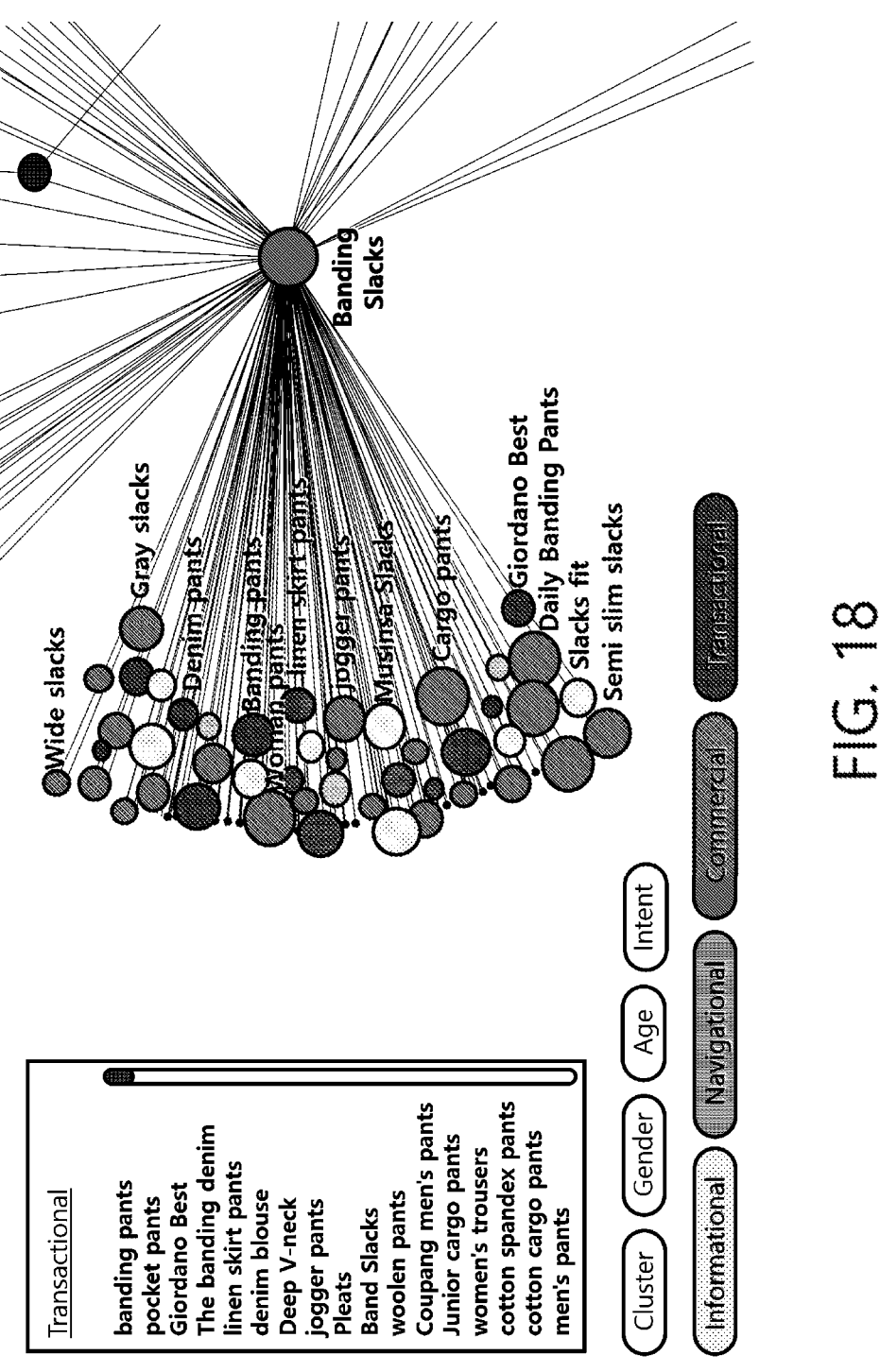
FIG. 18 is an exemplary diagram of a search term network including search intention for each of search terms created in the service providing apparatus according to an embodiment of the present disclosure.

For example, as shown in FIG. 18, the search result provider 120 can create and transmit a search term network, in which a plurality of different colors corresponding to a plurality of search intentions, respectively, is set in advance so that nodes are displayed by different colors between a plurality of search terms having different search intentions, to the user terminal.

Accordingly, the search result provider 120 can create and transmit a search interface, which includes a search term network in which search intentions corresponding to search terms can be recognized through the colors set to the nodes of the search terms, to the user terminal.

Meanwhile, the search result provider 120 can provide a search term network, in which when a node corresponding to a specific search term is selected, a path having the node as a start point or an end point (finish point) is provided, to the user terminal.

For example, the search result provider 120 can provide a search term network, in which when a user selects the node of a search term corresponding to 'concept one slim fit' through the search interface and then selects the selected node as an end point, a start point search term slit having 'concept one slim fit' as an end point is provided, to the user terminal.

Further, the search result provider 120 can provide a search term network for visualizing and providing a search path starting from 'slacks brand recommendation' and ends at 'concept one slim fit' using a shortest distance algorithm when an item having 'concept one slim fit' as an end point and 'slacks brand recommendation' as a start point (slacks brand recommendation→concept one slim fit) is selected from the start point search term list, to the user terminal.

As described above, the present disclosure can obtain, as a distance, the relationship between search terms in accordance with the search intention of an input search term and the exposure ranking of a following search term corresponding to the input search term, using a search engine, and can create and provide a search term network grouping and visualizing a plurality of search terms having high relevance on the basis of the distance between search terms according to search path information obtained for each of a plurality of different search terms on the basis of the distance obtained above. Accordingly, it is possible to provide search terms of which the relevance with a requested search term by a user is equal to or higher than a predetermined level and the search volume is equal to or higher than a predetermined level so that the user can clearly check the search terms through a search term network. Further, it is possible to greatly improve satisfaction and convenience of a user because it is possible to provide support to be able to easily find search terms that have high marketing efficiency and are not severely competitive in terms of price among search terms positioned around a requested search term checked through the search term network.

Further, since the present disclosure can set and provide search intention, which is considered most when users use a corresponding search term, for each of search terms pertaining to a search term network in the search term network, it is possible to support a seller who wants the perform marketing to be able to easily find a search term having search intention coinciding with the business purpose and having high marketing efficiency through the search term network.

Further, the present disclosure expresses connection relationship between search terms beyond the level of simply providing related search terms through a search term network UI created on the basis of search paths, whereby it is possible to provide main search procedures for products or services by users such that they can find the procedures, and in addition, to support users to be able to more intuitionally find their needs about what they request and what they compare.

FIG. 19 is a flowchart showing a service providing method of providing a search term network based on a search path of the service providing apparatus 100 according to an embodiment of the present disclosure.

The service providing apparatus 100 can automatically create one or more basic search terms, in which a keyword and characters are combined, while adding a series of different characters to the keyword, and can obtain one or more related search terms relevant to the basic search term though a preset search engine (S1).

Further, the service providing apparatus 100 can extract one or more following search terms from each of one or more response results respectively corresponding to features of one or more response features, which a search engine used by figuring out the search intention of an input search term on the basis of search result list information converted by applying the related search term to the search engine as the input search term, and can create and store relationship information about the distance from the input search term in the search term relation DB 102 for each of one or more following search terms using a distance calculation method of calculating, as a distance, a weight for the connection relationship between the input search term and a following search term according to an exposure ranking of a following search term in a response result corresponding to the following search term and the feature of the response result (S2).

Further, the service providing apparatus 100 can create a directed weighted graph setting inter-node distances by setting a plurality of search terms as nodes, respectively, on the basis of the plurality of items of relationship information stored in the search term relationship DB 102, then create search path information for each of one or more search paths connecting a start node and an end node determined in accordance with an algorithm set in advance in the directed weighted graph, create statistics information averaging statistics for respective items set in advance for a plurality of search terms included in the search path information, and then match and store the statistics information with the search path information in the search path DB 104 (S3).

Further, the service providing apparatus 100, when search term network request information, which includes a requested search term and a search condition, is received from a user terminal (S4), extracts one or more items of search path information including the requested search term and satisfying the search condition from the search path DB, creates a search term network on the basis of the extracted one or more items of search path information, makes a plurality of different search term groups for the search term network in accordance with a preset grouping algorithm, and then sets different properties so that the plurality of different search term groups can be visually discriminated from each other, thereby being able to provide the created search term network to the user terminal (S5).

The components described in the embodiments of the present disclosure may be achieved by one or more common computers or computers for specific purposes, such as a storage, for example, a memory; hardware such as a processor, a controller, an ALU (arithmetic logic unit), a digital signal processor, a microcomputer, an FPGA (Field Programmable Gate Array), a PLU (programmable logic unit), and a microprocessor; and any devices that can execute software including a set of instructions and a combination thereof or instructions and can give responses.

The above description may be changed and modified by those skilled in the art without departing from the fundamental characteristics of the present disclosure. Accordingly, the embodiments described herein are provided merely not to limit, but to explain the spirit of the present disclosure, and the spirit of the present disclosure is not limited by the embodiments. The patent right of the present disclosure should be construed by the following claims and the scope and spirit of the disclosure should be construed as being included in the patent right of the present disclosure.

DESCRIPTION OF SYMBOLS

100: Service providing apparatus
10: Controller
20: Communication unit
30: Storage unit
101: Keyword DB
102: Related term relationship DB
103: Feature DB
104: Search path DB
105: Search volume DB
110: Search path manager
111: Search term expander
112: Search information extractor
113: Search path extractor
114: Optimal path recommender
120: Search result provider
What is claimed is:

1. A service providing apparatus for providing a search term network based on a search path, the service providing apparatus comprising:
a communication unit, wherein the communication unit is configured to communicate with a user terminal, a search engine that is provided from an external server, and an external knowledge server that provides an on-line electronic dictionary;

one or more processors; and
a memory coupled to the one or more processors and storing instructions that, when executed by the one or more processors, cause the service providing apparatus to:
automatically create one or more basic search terms in which a keyword and characters are combined while adding a series of different characters to the keyword, to obtain one or more related search terms relevant to the basic search term though the search engine, and then to extract one or more following search terms, based on search result list information converted by applying the related search term to the search engine, and as an input search term, to create and store relationship information about a distance from the input search term in a search term relationship database (DB) for each of the one or more following search terms using a distance calculation method of calculating, as a distance, a weight for connection relationship between the input search term and a following search term according to an exposure ranking of a following search term in a response result according to a response function corresponding to a following search term of a response function, which the search engine uses by figuring out search intention of the input search term, and a feature of the response result, and to create and store search path information in a search path database (DB) for each of one or more search paths connecting a start node and an end node determined in accordance with a preset algorithm by setting a plurality of search terms as nodes, based on a plurality of items of relation information stored in the search term relationship database (DB); and
extract one or more items of search path information, which includes a requested search term and satisfies a search condition, from the search path database (DB) when search term network request information including the requested search term and the search condition is received from the user terminal, to create a search term network connecting different search terms having a distance on the basis of the extracted one or more items of search path information, to make a plurality of different search term groups in accordance with a preset grouping algorithm for the search term network, and then to provide search term network information, which is created by setting different properties so that the plurality of different search term groups can be visually discriminated from each other, to the user terminal,
wherein the search condition includes a connection direction with another node from a node corresponding to the requested search term, and the number of hops, and
wherein the service providing apparatus is configured to create a search term network by extracting one or more items of search path information satisfying the requested search term and the search condition and then by applying the extracted one or more items of search path information to ForceAtlas2 algorithm, and creates search term network information for a search term network grouped in a plurality of different search term groups by applying the search term network to louvain algorithm.

2. The service providing apparatus of claim 1, wherein the instructions that, when executed by the one or more processors, cause the service providing apparatus to:
automatically create one or more items of basic search terms, in which a keyword and characters are combined, while adding a series of different characters to the keyword, and to obtain one or more related search terms relevant to the basic search terms through the search engine;

extract one or more following search terms from each of one or more response results respectively corresponding to features of one or more response features, which the search engine used by figuring out search intention of an input search term based on search result list information converted by applying the related search term to the search engine as the input search term, and then to create and store relationship information about a distance from the input search term in a search term relation database (DB) for each of one or more following search terms using a distance calculation method of calculating, as a distance, a weight for connection relationship between the input search term and a following search term according to an exposure ranking of a following search term in a response result corresponding to the following search term and a feature of the response result; and create a directed weighted graph in which an inter-node distance is set by setting a plurality of search terms as nodes based on a plurality of items of relationship information stored in the search term relationship database (DB), and then to create and store search path information in a search path database (DB) for each of one or more search paths connecting a start node and an end node determined in accordance with a preset algorithm in the directed weighted graph, wherein the service providing apparatus is configured to collect the keyword from the external knowledge server, which provides the on-line electronic dictionary, by communicating with the external knowledge server, and to store the keyword in the keyword database (DB).

3. The service providing apparatus of claim 2, wherein the service providing apparatus calculates the weight by multiplying preset priority for a feature corresponding to the following search term by an exposure ranking for the following search term in a response result corresponding to the following search result, and sets the calculated weight as the distance between the following search term and the input search term.

4. The service providing apparatus of claim 2, wherein the service providing apparatus extracts one or more texts as additional following search terms corresponding to the following search terms, respectively, from each of one or more response results respectively corresponding to features for each of one or more response functions, which the search engine used by figuring out search intention of other input search terms based on search result list information in accordance with the distance calculation method converted by applying the following search terms as the input search terms to the search engine; calculates, as a distance, a weight for connection relationship between the input search terms and the additional following search terms according to exposure rankings of the additional following search terms in response results corresponding to the additional following search terms and features of the response results; and creates and stores relation information about distances from the input search terms that are the following search terms in the search term relationship database (DB) for each of the one or more additional following search terms.

5. The service providing apparatus of claim 1, wherein the service providing apparatus, based on respective search intention determination conditions for a plurality of steps set in advance to figure out search intention in one or more search result pages converted by applying a search term included in the search term network to the search engine, checks whether one or more preset search result items according to the search intention determination condition exist in upper N search results, and simultaneously, recognizes a search intention determination condition for each of one or more steps, which the one or more search result pages satisfy, among the respective search intention determination conditions for a plurality of steps; puts preset search intention into a search term network by setting the preset search intention to the search term to correspond to the recognized search intention determination condition for each of one or more steps among a plurality of preset search intentions, thereby setting search intention for each of search terms pertaining to the search term network; and creates a search term network in which search detection for each of the search terms is set.

6. The service providing apparatus of claim 5, wherein the one or more search result items set in the search intention determination condition include at least one of an encyclopedia page, a recommendation snippet, a knowledge panel, a video, academic search, a news item, a local map, a site link, an AD carousel, a keyword advertisement, and a URL of a pre-stored switch page.

7. A service providing apparatus for providing a search term network based on a search path, the service providing apparatus comprising:

one or more processors;

a memory coupled to the one or more processors and storing instructions;

a communication unit, wherein the communication unit is configured to communicate with a user terminal, a search engine that is provided from an external server, and an external knowledge server that provides an on-line electronic dictionary-; and a controller, wherein the controller is connected to the communication unit to communicate with the user terminal, the search engine, and the external knowledge server, wherein the controller is connected to a storage unit that stores a keyword database (DB), a search term relationship database (DB), and a search path database (DB), wherein the service providing apparatus is configured to:

automatically create one or more basic search terms in which a keyword and characters are combined while adding a series of different characters to the keyword, to obtain one or more related search terms relevant to the basic search term though the search engine, and then to extract one or more following search terms, based on search result list information converted by applying the related search term to the search engine, and as an input search term, to create and store relationship information about a distance from the input search term in a search term relationship database (DB) for each of the one or more following search terms using a distance calculation method of calculating, as a distance, a weight for connection relationship between the input search term and a following search term according to an exposure ranking of a following search term in a response result according to a response function corresponding to a following search term of a response function, which the search engine uses by figuring out search intention of the input search term, and a feature of the response result, and to create and store search path information in a search path database (DB) for each of one or more search paths connecting a start node and an end node determined in accordance with a preset algorithm by setting a plurality of search terms as nodes, based on a plurality of items of relation information stored in the search term relationship database (DB); and extract one or more items of search path information, which includes a requested search term and satisfies a search condition, from the search path database (DB) when search term network request information including the requested search term and the search condition is received from the user terminal, to create a search term network connecting different search terms having a distance on the basis of the extracted one or more items of search path information, to make a plurality of different search term groups in accordance with a preset grouping algorithm for the search term network, and then to provide search term network information, which is created by setting different properties so that the plurality of different search term groups can be visually discriminated from each other, to the user terminal, wherein the service providing apparatus obtains and stores a search volume for each search term through the search engine, and the service providing apparatus checks a search volume for each of search terms included in the search term network and creates a search term network in which a size of a node corresponding to a search term is adjusted in accordance with the search volume of the search term; checks one or more surrounding nodes connected with a specific node corresponding to a search term for each of the search terms included in the search term network and then calculates a network centrality index of a search term corresponding to the specific node in consideration of centrality of the specific node according to the number of the surrounding nodes and positions of the surrounding nodes and distances between the specific node and the surrounding nodes; and creates a search term network set such that a node of a search term having a network centrality index, which is equal to or higher than a reference value set in advance in accordance with a network centrality index calculated for each of the search terms, is separated from another node having a network centrality index less than the reference value.

8. The service providing apparatus of claim 7, wherein the service providing apparatus calculates the network centrality index of a search term using at least one of degree centrality, betweenness centrality, closeness centrality, and pagerank.

9. A service providing method for providing a search term network based on a search path of a service providing apparatus, wherein the service providing apparatus comprises one or more processors and a memory coupled to the one or more processors and storing instructions, wherein the service providing apparatus comprises a communication unit and a controller, wherein the communication unit is configured to communicate with a user terminal, a search engine that is provided from an external server, and an external knowledge server that provides an on-line electronic dictionary, wherein the controller is connected to the communication unit to communicate with the user terminal, the search engine, and the external knowledge server, wherein the controller is connected to a storage unit that stores a keyword database (DB), a search term relationship database (DB), and a search path database (DB), the service providing method comprising:

automatically creating one or more items of basic search terms, in which a keyword and characters are combined, while adding a series of different characters to the keyword, and obtaining one or more related search terms relevant to the basic search terms through a preset search engine;

extracting one or more following search terms based on search result list information converted by applying the related search term to the search engine as an input search term, and then creating and storing relationship information about a distance from the input search term in a search term relation database (DB) for each of one or more following search terms using a distance calculation method of calculating, as a distance, a weight for connection relationship between the input search term and a following search term according to an exposure ranking of a following search term in a response result according to a response function corresponding to a following search term of a response function, which a search engine uses by figuring out search intention of the input search term, and a feature of the response result;

creating and storing search path information in a search path database (DB) for each of one or more search paths connecting a start node and an end node determined in accordance with a preset algorithm by setting a plurality of search terms as nodes, based on a plurality of items of relation information stored in the search term relationship database (DB); and extracting one or more items of search path information, which includes a requested search term and satisfies a search condition, from the search path database (DB) when search term network request information including the requested search term and the search condition is received from a user terminal, creating a search term network based on the extracted one or more items of search path information, making a plurality of different search term groups in accordance with a preset grouping algorithm for the search term network, and then providing search term network information, which is created by setting different properties so that the plurality of different search term groups can be visually discriminated from each other, to the user terminal, wherein the search condition includes a connection direction with another node from a node corresponding to the requested search term, and the number of hops, and wherein the service providing apparatus creates a search term network by extracting one or more items of search path information satisfying the requested search term and the search condition and then by applying the extracted one or more items of search path information to ForceAtlas2 algorithm, and creates search term network information for a search term network grouped in a plurality of different search term groups by applying the search term network to louvain algorithm, wherein the service providing apparatus obtains and stores a search volume for each search term through an external server or the search engine, and wherein the service providing apparatus checks a search volume for each of search terms included in the search term network and creates a search term network in which a size of a node corresponding to a search term is adjusted in accordance with the search volume of the search term; checks one or more surrounding nodes connected with a specific node corresponding to a search term for each of the search terms included in the search term network and then calculates a network centrality index of a search term corresponding to the specific node in consideration of centrality of the specific node according to the number of the surrounding nodes and positions of the surrounding nodes and distances between the specific node and the surrounding nodes; and creates a search term network set such that a node of a search term having a network centrality index, which is equal to or higher than a reference value set in advance in accordance with a network centrality index calculated for each of the search terms, is separated from another node having a network centrality index less than the reference value, and wherein the service providing apparatus calculates the network centrality index of a search term using at least one of degree centrality, betweenness centrality, closeness centrality, and pagerank.

10. The service providing method of claim 9, wherein the service providing apparatus is further configured to:

automatically create one or more items of basic search terms, in which a keyword and characters are combined, while adding a series of different characters to the keyword, and to obtain one or more related search terms relevant to the basic search terms through the search engine;

extract one or more following search terms from each of one or more response results respectively corresponding to features of one or more response features, which the search engine used by figuring out search intention of an input search term based on search result list information converted by applying the related search term to the search engine as the input search term, and then to create and store relationship information about a distance from the input search term in a search term relation database (DB) for each of one or more following search terms using a distance calculation method of calculating, as a distance, a weight for connection relationship between the input search term and a following search term according to an exposure ranking of a following search term in a response result corresponding to the following search term and a feature of the response result; and create a directed weighted graph in which an inter-node distance is set by setting a plurality of search terms as nodes based on a plurality of items of relationship information stored in the search term relationship database (DB), and then to create and store search path information in a search path database (DB) for each of one or more search paths connecting a start node and an end node determined in accordance with a preset algorithm in the directed weighted graph, wherein the service providing apparatus is configured to collect the keyword from the external knowledge server, which provides the on-line electronic dictionary, by communicating with the external knowledge server, and to store the keyword in the keyword database (DB).

11. The service providing method of claim 10, wherein the service providing apparatus calculates the weight by multiplying preset priority for a feature corresponding to the following search term by an exposure ranking for the following search term in a response result corresponding to the following search result, and sets the calculated weight as the distance between the following search term and the input search term.

12. The service providing method of claim 10, wherein the service providing apparatus extracts one or more texts as additional following search terms corresponding to the following search terms, respectively, from each of one or more response results respectively corresponding to features for each of one or more response functions, which the search engine used by figuring out search intention of other input search terms based on search result list information in accordance with the distance calculation method converted by applying the following search terms as the input search terms to the search engine; calculates, as a distance, a weight for connection relationship between the input search terms and the additional following search terms according to exposure rankings of the additional following search terms in response results corresponding to the additional following search terms and features of the response results; and creates and stores relation information about distances from the input search terms that are the following search terms in the search term relationship database (DB) for each of the one or more additional following search terms.

* * * * *